United States Patent
Einziger et al.

(10) Patent No.: US 12,248,726 B2
(45) Date of Patent: *Mar. 11, 2025

(54) SYSTEMS AND METHODS FOR PROVIDING REAL-TIME AUDIO AND DATA

(71) Applicant: MIXHalo Corp., San Francisco, CA (US)

(72) Inventors: Michael Einziger, Santa Monica, CA (US); Ann Marie Simpson, Santa Monica, CA (US); Nathanial Pollack, San Francisco, CA (US); Vikram Singh, Los Altos Hills, CA (US)

(73) Assignee: Mixhalo Corp., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/121,346

(22) Filed: Mar. 14, 2023

(65) Prior Publication Data

US 2023/0297319 A1    Sep. 21, 2023

Related U.S. Application Data

(62) Division of application No. 15/978,754, filed on May 14, 2018, now Pat. No. 11,625,213.

(Continued)

(51) Int. Cl.
*G06F 3/00* (2006.01)
*G06F 3/16* (2006.01)
(Continued)

(52) U.S. Cl.
CPC .............. *G06F 3/162* (2013.01); *G06F 3/00* (2013.01); *H04L 65/1059* (2013.01);
(Continued)

(58) Field of Classification Search
CPC ....... H04L 65/65; H04L 65/70; H04L 65/611; H04L 47/2416; H04L 1/0018;
(Continued)

(56) References Cited

U.S. PATENT DOCUMENTS 4,593,404 A    6/1986 Bolin
5,131,051 A    7/1992 Kishinaga et al.
(Continued)

FOREIGN PATENT DOCUMENTS

GB          2552016 A  *  1/2018 ................ A63J 5/02
JP       2009/005114 A     1/2009
(Continued)

OTHER PUBLICATIONS

Jakubisin, "Real-Time Audio Transceiver Utilizing 802.11b Wireless Technology" (Year: 2007).*
(Continued)

*Primary Examiner* — Messeret F Gebre
(74) *Attorney, Agent, or Firm* — Cesari and McKenna, LLP

(57) ABSTRACT

A computerized method of delivering data to one or more client computing devices includes receiving, by a server computing device, a data stream starting at a first time; processing, by the server computing device, the data stream, thereby creating a processed data stream; transmitting, by the server computing device, via a wireless network in electronic communication with the server computing device, the processed data stream to the one or more client computing devices; and interpreting, by an application installed on the one or more client computing devices, the processed data stream, thereby recovering the data stream for use by the one or more client computing devices. A latency between the first time and the second time is less than 100 milliseconds.

20 Claims, 8 Drawing Sheets

Related U.S. Application Data

(60) Provisional application No. 62/639,346, filed on Mar. 6, 2018, provisional application No. 62/506,481, filed on May 15, 2017.

(51) Int. Cl.

| | |
|---|---|
| *H04L 65/1059* | (2022.01) |
| *H04L 65/65* | (2022.01) |
| *H04L 65/70* | (2022.01) |
| *H04L 65/75* | (2022.01) |
| *H04L 65/80* | (2022.01) |
| *H04W 4/02* | (2018.01) |
| *H04W 4/06* | (2009.01) |

(52) U.S. Cl.
CPC .............. *H04L 65/65* (2022.05); *H04L 65/70* (2022.05); *H04L 65/762* (2022.05); *H04L 65/764* (2022.05); *H04L 65/765* (2022.05); *H04L 65/80* (2013.01); *H04W 4/02* (2013.01); *H04W 4/06* (2013.01)

(58) Field of Classification Search
CPC . H04L 65/1059; H04L 65/762; H04L 65/764; H04L 65/765; H04L 65/80; G06F 3/16; G06F 3/162; G06F 3/00; G10H 1/0058; G10H 2240/175; H04W 4/02; H04W 4/06; Y02D 30/70
See application file for complete search history.

(56) References Cited

U.S. PATENT DOCUMENTS

| | | | |
|---|---|---|---|
| 5,619,582 A | 4/1997 | Oltman et al. | |
| 5,822,440 A | 10/1998 | Oltman et al. | |
| RE38,405 E | 1/2004 | Clair, Jr. et al. | |
| 6,680,906 B1 | 1/2004 | Nguyen | |
| 7,995,770 B1 | 8/2011 | Simon | |
| 8,290,174 B1 | 10/2012 | Simon | |
| 8,379,874 B1 | 2/2013 | Simon | |
| 8,577,053 B1 | 11/2013 | Simon | |
| 8,588,432 B1 | 11/2013 | Simon | |
| 8,938,078 B2 | 1/2015 | Meyer | |
| 9,137,823 B1 | 9/2015 | Liu et al. | |
| 9,247,337 B2 | 1/2016 | Foudhaili et al. | |
| 9,398,394 B2 | 7/2016 | Bongiovi et al. | |
| 9,635,482 B2 | 4/2017 | Menke | |
| 9,635,484 B2 | 4/2017 | Kuhr et al. | |
| 9,716,946 B2 | 7/2017 | Goshen et al. | |
| 9,788,108 B2 | 10/2017 | Goshen et al. | |
| 9,841,942 B2 | 12/2017 | Tull | |
| 9,864,573 B2 | 1/2018 | Tull | |
| 9,894,445 B2 | 2/2018 | Feldt | |
| 9,916,835 B2 | 3/2018 | Frey et al. | |
| 9,918,179 B2 | 3/2018 | Kuhr et al. | |
| 9,930,462 B2 | 3/2018 | Goshen et al. | |
| 9,942,675 B2 | 4/2018 | Tull | |
| 10,001,968 B1 | 6/2018 | Slick | |
| 10,003,901 B1 | 6/2018 | Slick | |
| 10,104,147 B2 | 10/2018 | Schmidt et al. | |
| 10,236,031 B1* | 3/2019 | Gurijala | G10L 19/018 |
| 10,257,074 B1* | 4/2019 | Singh | H04L 45/16 |
| 10,299,059 B1 | 5/2019 | Slick | |
| 10,362,379 B2 | 7/2019 | Georgi et al. | |
| 10,375,134 B2 | 8/2019 | Cauduro Dias de Paiva et al. | |
| 10,609,464 B2 | 3/2020 | Georgi et al. | |
| 10,616,303 B2 | 4/2020 | Christiansen et al. | |
| 10,686,897 B2 | 6/2020 | Werner et al. | |
| 10,827,253 B2 | 11/2020 | Boetcher et al. | |
| 2002/0013833 A1 | 1/2002 | Wyatt et al. | |
| 2004/0103282 A1 | 5/2004 | Meier et al. | |
| 2005/0086289 A1 | 4/2005 | Rosenberg et al. | |
| 2007/0223675 A1* | 9/2007 | Surin | H04L 47/22 |
| | | | 379/202.01 |
| 2008/0049703 A1 | 2/2008 | Kneckt et al. | |
| 2008/0189750 A1 | 8/2008 | Yoon et al. | |
| 2008/0201424 A1 | 8/2008 | Darcie | |
| 2009/0010191 A1 | 1/2009 | Wentink | |
| 2009/0113022 A1* | 4/2009 | Quoc | H04N 21/42203 |
| | | | 709/218 |
| 2010/0110962 A1 | 5/2010 | Igarashi et al. | |
| 2011/0055444 A1 | 3/2011 | Henriksson et al. | |
| 2011/0185286 A1 | 7/2011 | Moyers et al. | |
| 2012/0079067 A1 | 3/2012 | Stout et al. | |
| 2013/0022131 A1 | 1/2013 | Ocon et al. | |
| 2014/0140209 A1 | 5/2014 | Shihada et al. | |
| 2014/0181779 A1 | 6/2014 | Cao | |
| 2014/0297799 A1* | 10/2014 | Gordon | H04L 65/611 |
| | | | 709/217 |
| 2015/0180748 A1 | 6/2015 | Ding et al. | |
| 2015/0254056 A1 | 9/2015 | Walker et al. | |
| 2015/0256473 A1 | 9/2015 | Walker et al. | |
| 2015/0296502 A1 | 10/2015 | Gerhardt et al. | |
| 2015/0317197 A1 | 11/2015 | Blair | |
| 2015/0319583 A1 | 11/2015 | McIntyre et al. | |
| 2015/0341758 A1 | 11/2015 | Aggarwal et al. | |
| 2016/0037176 A1 | 2/2016 | Chari | |
| 2016/0057522 A1 | 2/2016 | Choisel et al. | |
| 2016/0100362 A1 | 4/2016 | Palanisamy et al. | |
| 2016/0255131 A1 | 9/2016 | Bulava et al. | |
| 2016/0278007 A1 | 9/2016 | Gokhale | |
| 2016/0286260 A1* | 9/2016 | Lawrence | H04N 21/43072 |
| 2016/0360256 A1 | 12/2016 | Van Os et al. | |
| 2017/0142535 A1* | 5/2017 | Aggarwal | H04L 65/613 |
| 2017/0201940 A1* | 7/2017 | Koratekere Honnappa | H04W 52/0232 |
| 2017/0235544 A1 | 8/2017 | Nyegaard et al. | |
| 2018/0020287 A1 | 1/2018 | Goshen et al. | |
| 2018/0069662 A1 | 3/2018 | Sugaya et al. | |
| 2018/0234742 A1 | 8/2018 | Abrams | |
| 2018/0249277 A1 | 8/2018 | Voss et al. | |
| 2018/0270139 A1 | 9/2018 | Singh | |
| 2019/0173938 A1 | 6/2019 | Tull | |
| 2019/0179597 A1 | 6/2019 | Tull et al. | |
| 2019/0182557 A1 | 6/2019 | Tull | |
| 2019/0349608 A1 | 11/2019 | Pollet | |
| 2019/0356718 A1 | 11/2019 | Haustein et al. | |
| 2020/0014742 A1 | 1/2020 | Pollet | |

FOREIGN PATENT DOCUMENTS

| | | |
|---|---|---|
| JP | 2010/068111 A | 3/2010 |
| JP | 2012/212142 A | 11/2012 |
| WO | WO-2006/110975 A1 | 10/2006 |
| WO | WO-2014/154822 A1 | 10/2014 |

OTHER PUBLICATIONS

Y. Lu, Z. Qiao, P. Zhang and L. Guo, "Ranking-Based Music Recommendation in Online Music Radios," 2016 IEEE First International Conference on Data Science in Cyberspace (DSC), Changsha, China, 2016, pp. 614-619 (Year: 2016).*

Dias, R., & Fonseca, M. J. (2013). Improving music recommendation in session-based collaborative filtering by using temporal context doi:http://dx.doi.org/10.1109/ICTAI.2013.120 (Year: 2013).*

P. C. Bach, N. Vyrva and S. K. Stigberg, "Tangible music player: Music collaboration," 2015 International Conference on Collaboration Technologies and Systems (CTS), Atlanta, GA, USA, 2015, pp. 399-406 (Year: 2015).*

M. Levy and M. Sandler, "Music Information Retrieval Using Social Tags and Audio," in IEEE Transactions on Multimedia, vol. 11, No. 3, pp. 383-395, Apr. 2009 (Year: 2009).*

Carot et al "Paper Presentation at the 'Music in the Global Village' Conference" International School of New Media at the University of Lubeck, 2007.

Cutietta "The Internet for Ensemble Performance" 2004.

Denon "Wireless, AP or Client Isolation" 2016.

Discover New Worlds with MobileConnect, 2014.

El-Shimy et al "EmbodiNet: Enriching Distributed Musical Collaboration Through Embodied Interactions" 15th Human-Computer Interaction (Interact), pp. 1-19, 2015.

(56) References Cited

OTHER PUBLICATIONS

Final Office Action issued in U.S. Appl. No. 15/978,726 on Mar. 28, 2022.
Fitzek et al "Robust Header Compression (ROHC) Performance for Multimedia Transmission Over 3G/4G Wireless Networks" Wireless Pers Commun vol. 32, pp. 23-41, 2005.
Fong et al "Online eLearning System for Live Band Practicing" 2016 International Symposium on Educational Technology (ISET), pp. 69-72, 2016.
Gettelman "Yes Mines Cutting Edge of Sound" Orlando Sentinel, 1994.
Giuli et al "Orchestral: A Distributed Platform for Virtual Music Groups and Music Distance Learning Over the Internet in Java™ Technology" Proceedings IEEE International Conference on Multimedia Computing and Systems, pp. 987-988, 1999.
"IP Multicast Network Management" Cisco Systems.
Kening "Yes Answers Critics Who Think They're Ready for Scraphead" Chicago Tribute, 1994.
Lee "What is the Difference Between UDP and TCP Internet Protocols?" Reliability Handbook, 2019.
Multicast with Wireless LAN Controllers (WLCs) and Lightweight Access Points (LAPs) Configuration Example.
Pei et al "Why it Takes so Long to Connect to a WiFi Access Point" IEEE Conference on Computer Communications, pp. 1-9, 2017.
Sawchuk "From Remote Media Immersion to Distributed Immersive Performance" 2003.
Sui et al "Characterizing and Improving WiFi Latency in Large-Scale Operational Networks" pp. 347-360.
Viachakis et al "Using a Dedicated Toolkit and the Cloud to Coordinate Shared Music Representations" The $5^{th}$ International Conference on Information, Intelligence, Systems, and Applications, pp. 20-26, 2014.
"Talk (Yes Album)" Wikipedia Encyclopedia.
Facchinetti et al "Real-Time Voice Streaming Over IEEE 802.15.4" the IEEE Symposium on Computers and Communications, pp. 985-990, 2010.
Gujar et al "Realtime Audio Streaming Using Visible Light Communication" 2016 International Conference on Inventive Computation Technologies (ICICT), pp. 1-3, 2016.
Ichhorn et al "A Realtime Streaming Architecture for In-Car-Multimedia: Design Guidelines and Prototypical Implementation" 2008.
International Search Report and Written Opinion issued in International Patent Application No. PCT/US2018/032532 on Oct. 9, 2018.
International Search Report and Written Opinion issued in International Patent Application No. PCT/US2018/032535 on Aug. 29, 2018.
Invitation to Pay Additional Fees and, Where Applicable, Protest Fee issued in International Patent Application No. PCT/US2018/032532 on Aug. 14, 2018.
Kleimola "Latency Issues in Distributed Musical Performance" 2006.
Notice of Allowance issued in U.S. Appl. No. 15/978,726 on Jul. 13, 2022.

\* cited by examiner

SYSTEMS AND METHODS FOR PROVIDING REAL-TIME AUDIO AND DATA

CROSS-REFERENCE TO RELATED APPLICATIONS

This application claims priority to U.S. patent application Ser. No. 15/978,754, filed May 14, 2018 and entitled "Systems and Methods for Providing Real-Time Audio and Data," which claims priority to U.S. Provisional Patent Application No. 62/506,481, filed May 15, 2017 and entitled "Systems and Methods for Providing Enhanced Audio." This application also claims priority to U.S. Provisional Patent Application No. 62/639,346, filed Mar. 6, 2018, entitled "Systems and Methods for Real-Time Data Streaming." The contents of these applications are hereby incorporated herein by reference in their entireties.

FIELD OF THE INVENTION

The invention relates generally to the field of real-time delivery of data, such as audio, over wireless networks. More specifically, the invention relates to systems and methods for providing real-time data to one or more client computing devices via a wireless network, e.g., providing enhanced audio via a network access point ("AP") to a live concert attendee having a mobile listening device.

BACKGROUND

In a traditional audio event setting, such as a concert or a speech, an attendee listens to audio in a venue via a public address ("PA") system. Using this setup, the quality of sound reaching the listener is limited by the quality of the PA system and by certain characteristics of the venue. For example, the venue's size, shape, and susceptibility to weather conditions, such as rain or wind gusts, can cause degradation in the audio signal transmitted by the PA system. In addition, certain listeners, particularly those far away from the audio source, may perceive an asynchronicity between what they view on stage and what they hear. For these reasons, many listeners' audio experience may be sub-optimal.

There have been several failed attempts to address one or more of these issues. For example, U.S. Pat. No. 8,938,078 to Meyer describes a system that delivers a supplemental audio signal to a listener through a pair of headphones that counteracts distortions and degradations of a primary broadcast signal. Audio inputs (e.g., guitar, keyboard, and microphone audio) are combined in an audio mixer. The audio mixer outputs a processed audio signal to a primary sound system. The primary sound system then broadcasts the primary audio signal (e.g., via a PA system), while the supplemental audio signal is transmitted via Wi-Fi to the listener on a delay. The delay between audio signals is determined based upon, e.g., the listener's location or by an electronic measurement.

Such systems suffer from several drawbacks. First, the precision of using a supplemental audio signal to counter the deficiencies of the primary audio signal is limited, at least by the inherent difficulties of matching two complex waveforms originating from different sources, while simultaneously accounting for systemic errors. As a result, clashing sounds or "echo effects" can be heard. Second, such systems do not alleviate incongruities between what attendees see on stage and what they hear. To date, a reliable solution capable of handling high listener traffic, while delivering a high-quality audio experience to most or all listeners in real-time, has remained elusive.

SUMMARY OF THE INVENTION

The present invention includes systems and methods for enhancing the experience of listening to live audio such as music performed live at a concert venue. Live audio, such as an uncompressed audio signal (e.g., encoded as Linear Pulse-Code Modulation ("LPCM")), is streamed in real-time (e.g., using a Real-time Transport Protocol ("RTP") connection over User Datagram Protocol ("UDP")) to a listener's mobile device so that the listener can hear the live audio on his or her favorite headphones (which could be, for example, wireless headphones, wired headphones, earbuds, a dedicated Linux piece of audio hardware, etc.) rather than over a traditional PA system. The streamed audio has a low latency with respect to the live performance, such that it is either imperceptible or minimally perceptible to the listener (e.g., is less than about 100 milliseconds, or optionally is about 50 milliseconds or less, and in some cases is about 20 milliseconds or less). The invention is scalable to enable many (e.g., in some embodiments, thousands, tens of thousands, or theoretically limitless) listeners to listen simultaneously in a venue with a high density of attendees. Thus, each listener can enjoy an experience that outperforms the experience of hearing a PA system or speakers in a concert venue.

In one aspect, the invention includes a computerized method of delivering audio to one or more client computing devices. The method includes receiving, by an audio server computing device, a live audio signal starting at a first time. The method also includes processing, by the audio server computing device, the live audio signal, thereby creating a data representation of the live audio signal. The method also includes transmitting, by the audio server computing device, via a wireless network in electronic communication with the audio server computing device, the data representation of the live audio signal to the one or more client computing devices. The method also includes interpreting, by the one or more client computing devices, the data representation of the live audio signal, thereby producing an interpreted audio signal. The method also includes providing, by the one or more client computing devices, the interpreted audio signal to a user listening device starting at a second time. A latency between the first time and the second time is less than 100 milliseconds.

In some embodiments, the latency between the first time and the second time is less than 50 milliseconds. In some embodiments, the latency between the first time and the second time is less than 20 milliseconds. In some embodiments, the audio is real-time concert audio and the one or more client computing devices include smartphones of concert attendees. In some embodiments, the one or more client computing devices include standalone hardware for receiving the audio. In some embodiments, the wireless network supports one or more of unicast, multicast and broadcast data transmission modes. In some embodiments, multicast mode is enabled and multicast IGMP snooping is disabled for the wireless network. In some embodiments, a beacon interval of the wireless network is set to between 10 and 100 milliseconds. In some embodiments, a multicast transmit speed of the wireless network is set to between 1 Mb/s and 54 Mb/s when the wireless network uses a 2.4 GHz band or 6 MB/s and 54 MB/s when the wireless network uses a 5 GHz band. In some embodiments, a DTIM interval of the wireless network is set to 1 or 2. In some embodiments, the wireless network includes additional functionalities to enable low-latency data transmission, the additional functionalities including at least one of the abilities to: reprioritize multicast traffic; ignore nonessential traffic; disable client Power Save Mode (PSM); enable access isolation; advertise a default gateway address to the one or more client computing devices via DHCP as 0.0.0.0; send quality of service header information to the client computing devices; ignore select client computing devices going into PSM; not retransmit data packets as a result of failing to receive acknowledgement packets (e.g., per the IEEE 802.11 standard).

In some embodiments, the data representation of the live audio signal includes one or more data packets. In some embodiments, the wireless network includes the ability to transmit multiple duplicates of each data packet to mitigate data packet loss. In some embodiments, creating a data representation of the live audio signal includes using one of the following compression codecs: AAC, HE-AAC MP3, MPE VBR, Apple Lossless, IMA4, IMA ADPCM, or Opus. In some embodiments, the audio server computing device uses location information provided by the client computing device to optimize the audio mix delivered to the client computing device (e.g., based on the distance between the AP and the server, or the client computing device and the server, or the AP and the client, or a combination of the three; by adding a static correction based on the distance between the AP and the server; by deciding not to correct one or more individual clients; using a Bluetooth beacon in the AP; using a client computing device's microphone to locate a distance from a reference point; or by using wireless triangulation). In some embodiments, the interpreted audio signal is optimized to account for surrounding or ambient audio to avoid an echo effect. In some embodiments, the audio delivered to the one or more client computing devices includes two or more simultaneous live streaming audio signals. In some embodiments, the one or more client computing devices are configured to mix the two or more simultaneous live streaming audio signals according to user-specified criteria. In some embodiments, the one or more client computing devices are configured to mix the interpreted audio signal with audio provided by microphone equipment of the one or more client computing devices. In some embodiments, the one or more client computing devices are configured to synchronize the interpreted audio signal with video provided by camera equipment of the one or more client computing devices. In some embodiments, the one or more client computing devices are installed with software including one or more social networking features (e.g., sharing recorded sound or video over a social medial platform). In some embodiments, the one or more client computing devices provide a majority of audio frequencies to the user listening device and a public address system provides audio tones in the range of 20 Hz to 1000 Hz. In some embodiments, the latency between the first time and the second time is buffered manually or automatically by the one or more client computing devices.

In another aspect, the invention features a system for delivering audio to a listener. The system includes an audio server computing device configured to receive a live audio signal starting at a first time and to convert the live audio signal into a data representation of the live audio signal. The audio server computing device includes an audio hardware interface (for example, a multi-channel or a single channel audio hardware interface); a server computer in electronic communication with the audio hardware interface; and specialized software installed on the server computer, the specialized software including a hardware driver and media processing software. The system also includes a wireless network configured to communicate electronically with the network hardware of the audio server computing device and to transmit the data representation of the live audio signal. The system also includes one or more client computing devices configured to receive the data representation of the live audio signal via the wireless network, interpret the data representation of the live audio signal, thereby producing an interpreted audio signal, and provide the interpreted audio signal to one or more user listening devices starting at a second time. The one or more client computing devices each include: a hardware wireless network interface and an audio application installed on the client computing device configured to interpret the data representation of the live audio signal, thereby producing an interpreted audio signal. A latency between the first time and the second time is less than 100 milliseconds.

In some embodiments, the latency between the first time and the second time is less than 50 milliseconds. In some embodiments, the latency between the first time and the second time is less than 20 milliseconds. In some embodiments, the audio is real-time concert audio and the one or more client computing devices include smartphones of concert attendees. In some embodiments, the one or more client computing devices are standalone hardware for receiving the audio. In some embodiments, the wireless network supports one or more of unicast, multicast and broadcast data transmission modes. In some embodiments, multicast mode is enabled and multicast IGMP snooping is disabled for the wireless network. In some embodiments, a beacon interval of the wireless network is set to between 10 and 100 milliseconds. In some embodiments, a multicast transmit speed of the wireless network is set to between 1 Mb/sand 54 Mb/s when the wireless network uses a 2.4 GHz band or 6 MB/s and 54 MB/s when the wireless network uses a 5 GHz band. In some embodiments, a DTIM interval of the wireless network is set to 1 or 2. In some embodiments, the wireless network includes additional functionalities to enable low-latency data transmission, the additional functionalities including at least one of the abilities to: reprioritize multicast traffic; ignore nonessential traffic; disable client PSM; enable access isolation; advertise a default gateway address to the one or more client computing devices via DHCP as 0.0.0.0; send quality of service header information to the client computing devices; ignore select client computing devices going into PSM; not retransmit data packets as a result of failing to receive acknowledgement packets (e.g., per the IEEE 802.11 standard).

In some embodiments, the wireless network includes the ability to transmit multiple duplicates of each data packet to mitigate data packet loss. In some embodiments, creating a data representation of the live audio signal includes using one of the following compression codecs: AAC, HE-AAC MP3, MPE VBR, Apple Lossless, IMA4, IMA ADPCM, or Opus. In some embodiments, the audio server computing device uses location information provided by the client computing device to optimize the audio mix delivered to the client computing device. In some embodiments, the interpreted audio signal is optimized to account for surrounding or ambient audio to avoid an echo effect. In some embodiments, the audio delivered to the one or more client computing devices includes two or more simultaneous live streaming audio signals. In some embodiments, the one or more client computing devices are configured to mix the two or more simultaneous live streaming audio signals according to user-specified criteria. In some embodiments, the one or more client computing devices are configured to mix the interpreted audio signal with audio provided by microphone equipment of the one or more client computing devices. In some embodiments, the one or more client computing devices are configured to synchronize the interpreted audio signal with video provided by camera equipment of the one or more client computing devices. In some embodiments, the one or more client computing devices are installed with software including one or more social networking features. In some embodiments, the one or more client computing devices provide a majority of audio to the user listening device and a public address system provides audio tones in the range of 20 Hz to 1000 Hz. In some embodiments, the latency between the first time and the second time is buffered manually or automatically by the one or more client computing devices.

In another aspect, the invention features a method of playing streaming audio on a client computing device. The method includes connecting the client computing device to a wireless network. The method also includes launching a mobile audio application installed on the client computing device. The mobile audio application is configured to (1) receive from an audio server computing device a first set of data packets corresponding to an audio stream; (2) interpret the first set of data packets, thereby creating an interpreted audio stream containing a second set of data packets; and (3) buffer the interpreted audio stream. The method also includes outputting the interpreted audio stream to a user listening device in electronic communication with the client computing device, wherein outputting each audio packet in the second set of data packets of the interpreted audio stream occurs within 100 milliseconds of a corresponding audio packet entering the audio server computing device. In some embodiments, the latency between the first time and the second time is less than 50 milliseconds. In some embodiments, the latency between the first time and the second time is less than 20 milliseconds.

In another aspect, the invention features a method of minimizing total latency of a streaming audio signal produced by an audio system. The method includes individually minimizing a latency of one or more (e.g., each) of the following audio system components: an audio server's audio hardware interface; an audio server's audio hardware interface driver; an audio server application; an audio server's wireless network stack including a wireless network hardware interface driver; an audio server's wireless network hardware interface; an Ethernet wireless network; a wireless network access port; a wireless network; a mobile device's hardware wireless network interface; a mobile operating system's wireless network stack including a hardware wireless network interface driver; a mobile client application; a mobile operating system including audio hardware interface driver; and a mobile device's audio hardware interface. A sum of latencies of each of the above audio system components can be less than 100 milliseconds (or in some cases, less than 50 milliseconds, or in some cases, less than 20 milliseconds).

In another aspect, the invention includes an audio server. The audio server includes an audio hardware interface; a server computer in electronic communication with the audio hardware interface; an operating system installed on the server computer; specialized software installed on the server computer, the specialized software including an audio hardware interface driver and media processing software; and wireless network hardware in electronic communication with the server computer. The audio server is configured to produce a latency of less than 100 milliseconds between (1) a live audio signal reaching the audio server, and (2) playing of a recovered live audio signal by a user listening device in communication with the audio server. In some embodiments, the latency between the first time and the second time is less than 50 milliseconds. In some embodiments, the latency between the first time and the second time is less than 20 milliseconds.

In some embodiments, the system can provide other features allowing users to re-live the event including browsing the content they aggregated during the event including pictures, videos, and other interactions over social networks. In some embodiments, features are included to allow users to communicate and engage with their friends and people around the venue using text and/or voice in a "push-to-talk" manner, or to find each other in a crowd. In some embodiments, one or more listeners can engage with the concert before the event by partnering with companies selling tickets and allowing users to purchase their tickets directly in the mobile application. In some embodiments, the technology provides information about the venue during the event, such as a map of the venue with marked points of interest, a schedule of the event and other metadata related to currently played music, and other important venue-specific information. In some embodiments, a mixing effect is included to make the user more engaged with the surrounding environment, or to mitigate the impact of technical issues causing the playback to break. In some embodiments, streaming is enabled outside of the venue and listening to past-recorded performances, thereby moving beyond engaging listeners attending the live event. In some embodiments, a service is provided that allows user to listen to a live performance from anywhere in the world over the Internet or to listen to recorded past live performances. In some embodiments, the client computing device includes headphones that function as "in-ear monitors," which lock most sound out from the venue's PA system. In some embodiments, the "custom mix" can be recorded on the concert attendee's mobile device and synchronized with a video of the concert performance.

In another aspect, the invention features a computerized method of delivering data to one or more client computing devices. The method includes receiving, by a server, a data stream starting at a first time. The method includes processing, by the server, the data stream, thereby creating a processed data stream. The method includes transmitting, by the server, via a wireless network in electronic communication with the server, the processed data stream to the one or more client computing devices. The method includes interpreting, by an application installed on the one or more client computing devices, the processed data stream, thereby recovering the data stream for use by the one or more client computing devices. A latency between the first time and the second time is less than 100 milliseconds. In some embodiments, a latency between the first time and the second time is less than 50 milliseconds. In some embodiments, a latency between the first time and the second time is less than 20 milliseconds.

In some embodiments, a "more data" flag is set to "true" for all broadcast and/or multicast frames in the processed data stream. In some embodiments, a multicast flag in the Traffic Indication Map (TIM) is set for every Beacon, thereby disabling buffering of broadcast and/or multicast traffic traveling through the wireless network. In some embodiments, MAC Protocol Data Unit Aggregation is disabled for the wireless network. In some embodiments, the method includes setting invalid values for a DTIM Count and a DTIM Interval. In some embodiments, the method includes using "Voice Queue" for all broadcast and/or multicast frames. In some embodiments, the method includes setting a DSCP value to 46 for all broadcast and/or multicast frames of the processed data stream. In some embodiments, the method includes setting, by an operator of the wireless network, a DTIM interval of the network access point to a first value; setting, by the operator of the wireless network, a DTIM count of the wireless network to a second value; transmitting, by the wireless network, a beacon including the set DTIM interval; and/or transmitting, by the wireless network, at least one of a multicast data stream or a unicast data stream to one or more client computing devices, wherein the second value is greater than the first value.

In some embodiments, the method includes receiving, by the client computing device, a beacon message including a DTIM count that is higher than a preset DTIM interval. In some embodiments, isolation of each client computing device from the internet and/or other client computing devices on the network helps to achieve low latency transmission of real-time data. In some embodiments, the wireless network diverts all other traffic (e.g., to the LTE network of the mobile device, if available). In some embodiments, modifications are made to one or more drivers that allow passing a single command to enable and disable PSM, as well as to control other features (e.g., multicast and/broadcast). In some embodiments, the method includes reprioritizing, and/or ignoring certain types of wireless network traffic. Specifically, a specialized file can be created on the AP that can be called upon by a certain command (e.g., something easy to remember such as "Echo 1" or "Echo 0") that tells the driver whether to function in the established mode. In some embodiments, processing of "virtual carrier sense" can be disabled (e.g., by changing a hardware register setting) to make the AP ignore certain unneeded frames and/or non-essential traffic.

In another aspect, the invention includes a system for delivering data to a client computing device. The system includes a server configured to receive a data stream and to convert the data stream into a processed data stream. The server includes an interface for receiving the data stream; a server computer in electronic communication with the interface for receiving the data stream; an operating system installed on the server computer; specialized software installed on the server computer, the specialized software including a hardware driver and data stream processing software; and network hardware in electronic communication with the server computer. The system also includes a wireless network access point configured to communicate with the network hardware of the server and to transmit the processed data stream. A latency between receiving the data stream by the server and transmitting the processed data stream by the wireless network access point is less than 100 milliseconds. In some embodiments, the latency is less than 50 milliseconds. In some embodiments, the latency is less than 20 milliseconds.

In another aspect, the invention includes a method of receiving streaming data on a client computing device. The method includes connecting, by the client computing device, to a wireless network access point. The method includes launching, by the client computing device, a software application installed on the client computing device. The software application is configured to (1) receive from a server in electronic communication with the wireless network access point a first set of data packets corresponding to a data stream; (2) interpret the first set of data packets, thereby creating an interpreted data stream containing a second set of data packets; and (3) buffer the interpreted data stream; and output, by the client computing device, the interpreted data stream to a client usable form, wherein outputting each data packet in the second set of data packets of the interpreted data stream occurs within 100 milliseconds of a corresponding data packet entering the server (or in some embodiments within 50 milliseconds, or in some embodiments within 20 milliseconds).

In another aspect, the invention includes a method of minimizing total latency of a streaming data stream produced by a streaming data system while preserving continuity of the streaming data stream. The method comprising individually minimizing a latency of one or more (e.g., each) of the following streaming data system components: a server hardware interface; a server hardware interface driver; a server application; a server network stack including a network hardware interface driver; a server network hardware interface; an Ethernet network; a wireless network access port; a wireless network; a mobile device's hardware wireless network interface; a mobile operating system's network stack including a hardware wireless network interface driver; a mobile client application; a mobile operating system; and a mobile device's hardware interface, wherein a sum of latencies of each of the above streaming data system components is less than about 100 milliseconds, or is optionally about 50 milliseconds or less, or is optionally about 20 milliseconds or less.

In another aspect, the invention includes a streaming data server. The streaming data server includes a hardware interface device; a server computer in communication with the hardware interface device; an operating system installed on the server computer; specialized software installed on the server computer, the specialized software including a hardware interface driver and data processing software; and network hardware in communication with the server computer. The streaming data server is configured to produce a latency of less than about 100 milliseconds, or optionally about 50 milliseconds or less, or optionally about 20 milliseconds or less, between (1) a live data stream reaching the streaming data server, and (2) playback of a recovered data stream by a user device in communication with the streaming data server.

In another aspect, the invention includes a method of configuring a network access point for low latency data streaming. The method includes setting, by an operator of the network access point, a DTIM interval of the network access point to a first value; setting, by the operator of the network access point, a DTIM count of the network access point to a second value; transmitting, by the network access point, a beacon including the set DTIM interval; and/or transmitting, by the network access point, at least one of a multicast data stream or a unicast data stream to one or more audio clients, wherein the second value is greater than the first value. In some embodiments, setting the DTIM interval and the DTIM count are achieved by calling a single user command configured to re-set one or more predefined driver settings.

In another aspect, the invention includes a method of receiving a low-latency data stream from a network access point by a client in communication with the network access point. The method includes receiving, by the client, a beacon message including a DTIM count that is higher than a DTIM interval; interpreting, by the client, the DTIM count as an indication of malfunctioning by the network access point; and/or remaining active, by the client, for a longer duration than specified by the DTIM interval, thereby preventing the audio client from entering power save mode on schedule.

In another aspect, the invention includes a system for delivering streaming audio to an end user. The system includes (1) an audio server configured to receive a live audio signal and to convert the live audio signal into a data representation of the live audio signal. The audio server includes an audio hardware interface; a server computer in communication with the audio hardware interface; an operating system installed on the server computer; specialized software installed on the server computer, the specialized software including a hardware driver and media processing software; and network hardware in communication with the server computer; (2) a wireless network, including a network access point, configured to communicate with the network hardware of the audio server and to transmit the data representation of the live audio signal; and (3) an audio client configured to receive the data representation of the live audio signal via the wireless network. The audio client includes a hardware wireless network interface; a mobile device in communication with the hardware wireless network interface; an operating system installed on the mobile device; an audio application installed on the mobile device configured to interpret the data representation of the live audio signal, thereby producing an interpreted audio signal; and audio playback hardware in communication with the mobile device, the audio playback hardware configured to play the interpreted audio signal for the end user. A latency between receiving the live audio signal by the audio server and delivering the interpreted audio signal by the audio playback hardware is imperceptible or minimally perceptible to a listener, e.g., is less than about 100 milliseconds, or is optionally about 50 milliseconds or less, or is optionally about 20 milliseconds or less. The network access point is configured such that a DTIM interval is set to a lower value than a DTIM count of the network access point.

The concept of latency is a well-known problem associated with audio systems. There are many aspects that can contribute to the overall perceived latency by a listener, and there are many well-known ways of measuring and/or defining latency, some of which are discussed in this document. In this document, latency can generally be understood to refer to analog latency, which is measured from an input point of the analog-to-digital converter of the server (e.g., the audio server) to an output point of the digital-to-analog converter at the client (e.g., a client computing device for providing audio to a listener).

The present invention can also include systems and methods for transmitting data in real-time more generally (e.g., including but not limited to audio transmission). Further explanation regarding features that contribute to suitability for such purposes is in order.

The IEEE 802.11 standard is a set of technical specifications for implementing wireless local area network (WLAN) computer communication over specified frequency bands. PSM is a feature of the IEEE 802.11 standard by which a station (e.g., a device that has the capability to use the IEEE 802.11 protocol, such as a mobile device or another wireless network device) in communication with an AP suspends radio activity after a predetermined period of inactivity and periodically "wakes up" to see if the AP has any traffic destined for it. The purpose of PSM is to help stations conserve battery power when there is no useful information for them on the network. While a station is asleep, the AP buffers information intended specifically for that station. When the station wakes up to check in with the AP, the AP delivers any useful information it has in the buffer. The station then goes back to sleep until the next predetermined wake-up time. By going to sleep for periodic intervals, the station is allowed to conserve power. An AP will also start to buffer traffic (e.g., broadcast and/or multicast traffic) as soon as at least one station connected to the AP (e.g., a station which is supposed to receive the traffic) enters PSM to ensure that stations operating in PSM do not miss any data they were supposed to receive.

Traditional PSM operation can create significant issues for mobile devices attempting to receive real-time (e.g., having a low latency or "near real-time") data streams over a Wi-Fi network. If a mobile device enters PSM while attempting to receive a real-time data stream, it may miss part of the real-time data stream, creating a gap in transmission. Because transmission of data packets is very frequent for a real-time data stream, a mobile device has no time to sleep when receiving a real-time data stream. In addition, data retransmission is not an option, as any data missed would be in the past by the time it was received and would no longer be relevant. For example, if the real-time data stream corresponded to concert audio delivered to a listener in real-time, and the data stream were interrupted and re-transmitted, by the time the mobile device received the data stream and played the audio back for the listener, it would be too delayed to correspond to what the listener sees on stage, defeating the point of real-time streaming.

Many client devices (e.g., mobile devices, and/or devices running iOS software) are programmed to enter PSM automatically (e.g., by the chip manufacturer) after a predetermined amount of time if no information is specifically addressed to them over the network. Previously, one way to mitigate this issue was to increase the frequency with which the AP told all client devices that there was data addressed specifically to them (e.g., by being addressed to a broadcast address or by the clients subscribing to a multicast). This solution could be accomplished by setting the Beacon Interval to a low value (e.g., the PSM threshold, or the time set by the manufacturer to enter PSM) and the Delivery of Traffic Indication Message (DTIM) Interval to 1. By decreasing the Beacon Interval below the power save threshold, low latency transmission can be achieved on a traditional network. However, this approach carries the drawback that the frequency of the Beacon frames consumed so much airspace that little was left for the data stream itself and/or other essential traffic.

The issues created by PSM for real-time data streaming apply to both broadcast mode and multicast mode. In broadcast mode, data packets are addressed to every station connected to the AP. Therefore, as soon as any station connected to the AP enters PSM, all broadcast traffic will be buffered. In multicast mode, data packets are addressed to stations that have registered an interest in a particular multicast group. Therefore, as soon as any station that registered interest in a multicast group enters PSM, the traffic for this multicast group will be buffered. Stations have complete autonomy when it comes to PSM, and the IEEE 802.11 standard does not include any mechanism for the AP to influence stations regarding their PSM behavior other than the Beacon Interval and the DTIM Interval described above.

Unfortunately, this creates a weakest-link problem where behavior of one station can affect all the stations connected to the AP (e.g., a potentially unlimited number of stations). For this reason and others, broadcast and multicast traffic are typically avoided or minimized on wireless networks to the extent possible. As an example of this minimization, multicast packets are sent with the lowest available transmission rate, varying from 2 Mbps up to 54 Mbps.

The present invention contravenes this conventional wisdom by utilizing broadcast to a large degree, but in ways that avert the above-noted problems associated with broadcast and/or multicast traffic. In particular, the invention includes real-time data streaming over a Wi-Fi network (e.g., by strategically disabling PSM as discussed in detail below), which can be used, e.g., to enhance the experience of listening to live audio such as music performed live at a concert venue.

More specifically, the present invention includes a number of solutions that allow PSM to be disabled by modifying only APs. In some embodiments, the modifications are customized for certain Wireless Network Interface Controllers (WNICs), for example, WNICs manufactured by Broadcom. In some embodiments, one or more of the following modifications can be made to APs to prevent stations from entering PSM:

1. Setting the "More Data" flag to "true" for all broadcast/multicast frames: The More Data flag indicates that there are more frames to be sent. By enabling the flag for all frames, Broadcom WNIC is prevented from entering PSM for around 40 ms when waiting for an additional frame. This means that if at least one frame is sent every 40 ms, the station will not enter PSM. This modification does not violate the IEEE 802.11 standard, as this behavior resembles standard behavior when an AP buffers traffic. Traffic buffered because of PSM is sent following a Beacon, and every frame has the More Data flag set, except for the last one. Therefore, stations stay awake until they receive a frame with the More Data flag not set.
2. Setting invalid values for the DTIM Count and the DTIM Interval. Both the DTIM Count and the DTIM Interval are directly related to PSM operation. If the values are invalid (for example, if the DTIM Count is no less than the DTIM Interval), a station can choose not to enter PSM to ensure it will not miss any traffic from a potentially "misbehaving" AP. This prevents, for example, Broadcom WNIC's from entering into PSM.
3. Setting the Multicast flag in the Traffic Indication Map (TIM) for every Beacon: This flag indicates that every Beacon is followed by broadcast or multicast frames, which can help prevent stations from entering PSM.
4. Disabling buffering of broadcast and/or multicast traffic: This modification prevents APs from buffering broadcast and/or multicast traffic even when some stations are operating in PSM. This will cause severe packet loss for the stations operating in PSM, but it will allow the remaining stations to operate without buffering, e.g., in real-time.

In addition, the invention includes a number of modifications to APs to ensure immediate transmission of frames (and hence to minimize latency and/or jitter):

1. Using "Voice Queue" for all broadcast and/or multicast frames: Voice Queue has the highest priority except for management frames. Using Voice Queue for all broadcast and/or multicast frames ensures that broadcast and/or multicast frames are transmitted before lower priority traffic.
2. Disabling MAC Protocol Data Unit Aggregation (A-MPDU): A-MPDU increases network throughput, but it might delay frame transmission. Disabling it helps to ensure that frames are transmitted immediately.

Thus, the invention allows minimization of latency and/or jitter of broadcast and/or multicast traffic compared to a standard WLAN operating under PSM. When operating in PSM, broadcast and/or multicast traffic is buffered and sent after a Beacon. A standard value for the Beacon Interval is 100 ms and for the DTIM Period is 1. This means that broadcast and/or multicast traffic is sent every 100 ms, which means that latency is introduced by PSM in range of 0 ms-100 ms. Also, this causes Instantaneous Packet Delay Variation (IPDV) of down to −100 ms (e.g., Jitter, as described in RFC 3393).

These and other aspects of the invention will be more readily understood from the following descriptions of the invention, when taken in conjunction with the accompanying drawings and claims.

DETAILED DESCRIPTION

Figure 1:
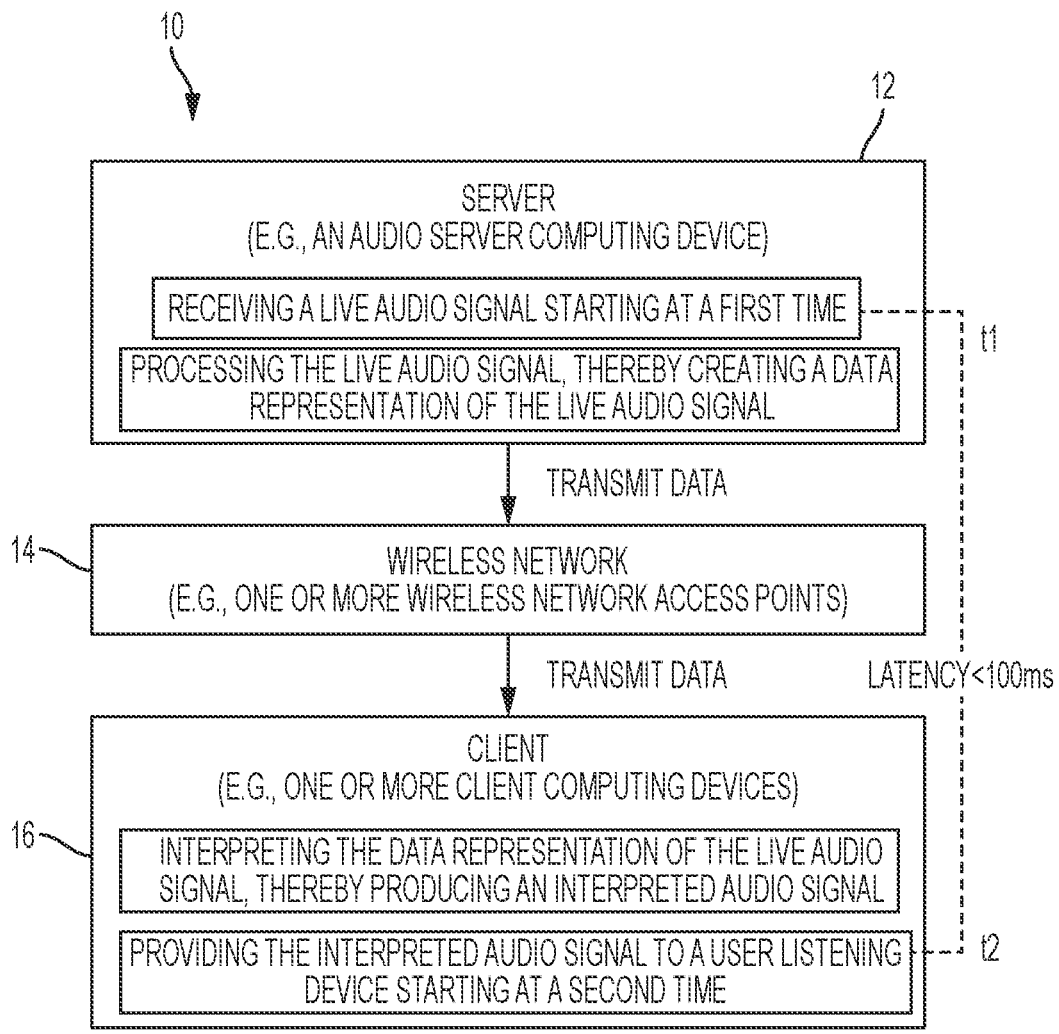
FIG. 1 is a schematic flow diagram illustrating a technology for real-time data (e.g., audio) delivery, according to an illustrative embodiment of the invention.

FIG. 1 is a schematic flow diagram 10 illustrating a technology for real-time data (e.g., audio) delivery, according to an illustrative embodiment of the invention. A computerized method can be used, for example, to deliver data (e.g., audio) from a server 12, via a wireless network 14, to one or more client computing devices 16. The method can include receiving, by the server 12 (e.g., an audio server computing device), a live audio signal starting at a first time (t1). The method can include processing, by the server 12, the live audio signal, thereby creating a data representation of the live audio signal. The method can include transmitting, by the audio server, via the wireless network 14 in electronic communication with the audio server, the data representation of the live audio signal to the one or more client computing devices 16. The method can include interpreting, by the one or more client computing devices 16, the data representation of the live audio signal, thereby producing an interpreted audio signal. The method can include providing, by the one or more client computing devices 16, the interpreted audio signal to a user listening device starting at a second time (ti). A latency between the first time and the second time can be less than 100 milliseconds, or optionally less than 50 milliseconds, or optionally less than 20 milliseconds. The wireless network 14 can be provided by one or more wireless access points. Each access point (AP) can support more than one network at the same time.

Figure 2A:
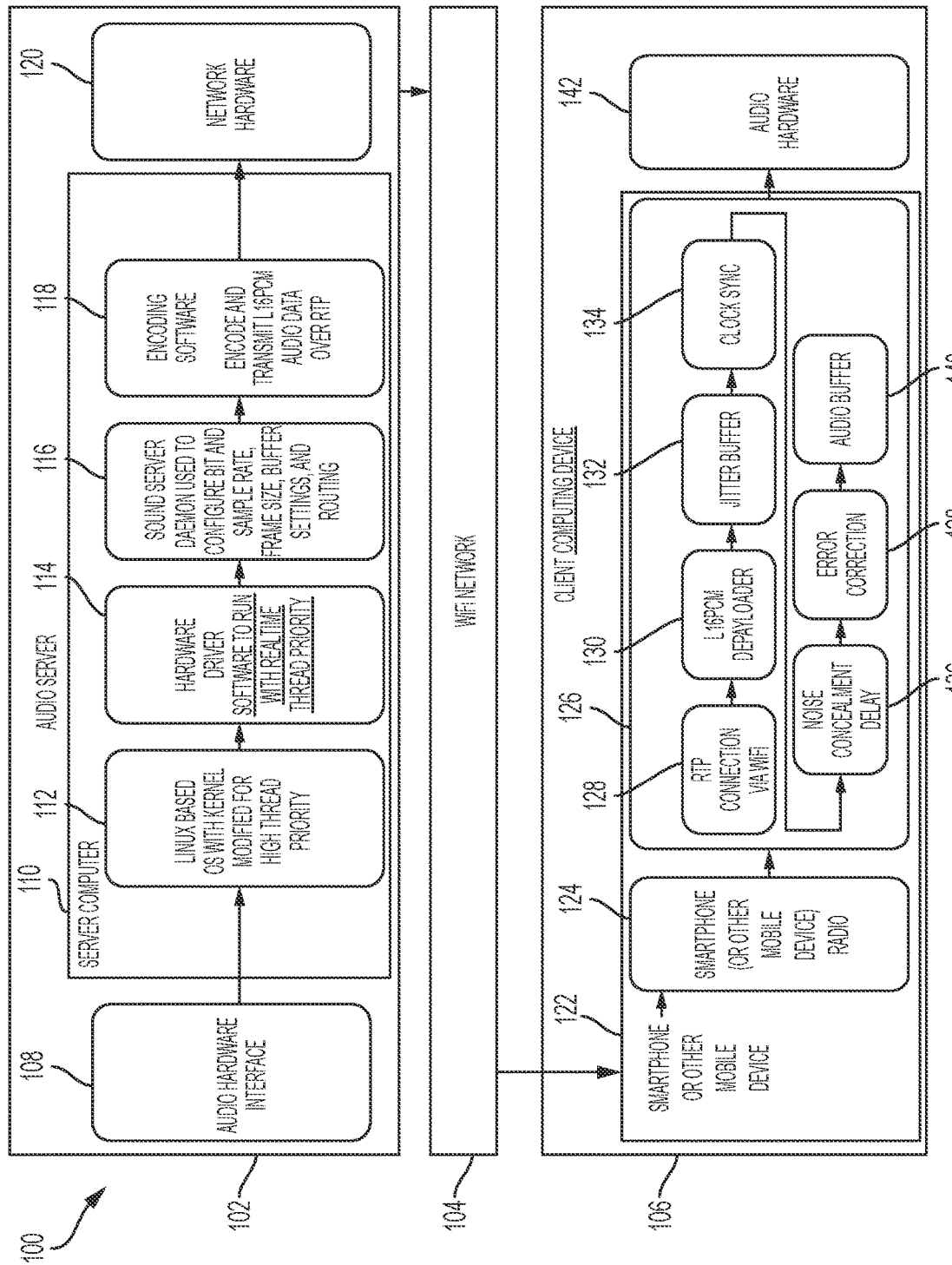
FIG. 2A is a schematic diagram of a system architecture for a real-time data (e.g., audio) delivery system, according to an illustrative embodiment of the invention.

FIG. 2A is a schematic diagram of a system architecture for a real-time data (e.g., audio) delivery system 100, according to an illustrative embodiment of the invention. FIG. 2A shows, for example, certain finer details of the technology shown in FIG. 1 above. Generally, the system 100 includes a server (e.g., an audio server) 102, a network 104 (e.g., including Wi-Fi and Ethernet modules and at least one AP), and a client computing device (e.g., an audio client) 106. Audio input to the system 100 (e.g., a live audio signal provided by stage equipment, which would traditionally be amplified and broadcast over a PA system) is provided to the audio server 102. The audio server 102 samples the signal, optionally encodes it, and sends it over the network 104 to at least one audio client 106. The audio server 102 is in communication with at least one Wi-Fi Access Point ("AP") (included within the network 104) with an Ethernet connection. Each audio client 106 includes a mobile device 122, such as a cell phone, having an audio application 126 installed on it and a user-listening device 142, such as a pair of headphones. Each user connects to the dedicated audio Wi-Fi network 104 using his or her mobile device (e.g., the mobile device 122), launches the audio application 126, and is ready to start listening. The audio application 126 receives a live audio stream over the Wi-Fi network 104, buffers it, and feeds the data into the mobile device's audio system 142. Thus, the system 100 enables streaming of audio to transmit real-time audio (e.g., music performed on stage) to the user's headphones.

FIG. 2A shows several detailed components of the audio server 102. For example, the audio server 102 includes an audio hardware interface 108 (e.g., a multi-channel audio hardware interface. The audio hardware interface 108 can include a sound card. In some cases, the sound card is a professional low-latency, high-end sound card, such as a RME HDSPe MADI sound card or a Focusrite Scarlett sound card. In some cases, the sound card is a built-in sound card on a personal computer. The audio server 102 also includes a server computer 110 in electronic communication with the audio hardware interface 108. The server computer 110 can be any system capable of handling the needs of the audio and networking hardware. The server computer 110 can be installed with an operating system, e.g., a Linux-based operating system 112 with a kernel modified for high thread priority and/or real-time operation. The server computer 110 can also have installed specialized software 114 including a hardware driver (e.g., an ALSA hardware driver) and audio processing software 116. The audio processing software 116 can include Jackaudio (as shown), which can be used to configure bit depth and sample rate, buffer settings and routing, or can use proprietary software for the same or similar functions. The audio processing software 116 can also include GStreamer 118, which can packetize and transmit L16PCM (LPCM with each sample represented as 16-bit signed integer encoded with two's complement notation) audio data over Real-time Transport Protocol, or can use proprietary software for the same or similar functions. The audio server 102 can also include network hardware 120 in electronic communication with the server computer 110. The network hardware 120 can include any hardware capable of at least 10 Mb/s communication over a standard Ethernet connection. 100 Mb/s or even 1000 Mb/s can be preferred to allow for additional network traffic. In this setup, the audio server 100 is configured to receive a live audio signal and to create a streaming audio signal based on the live audio signal (e.g., to convert the live audio signal into RTP packets containing a data representation of the corresponding live audio signal).

The network 104 is configured to communicate electronically with the network hardware 120 of the audio server 102 and to transmit the streaming audio signal to the audio clients (e.g., the audio client 106). The network 104 can be, by way of non-limiting example, an ASUS RT-AC5300 router with hardware wireless network interfaces, based on the Broadcom BCM4366 system on a chip ("SoC") or APU2 PCB (Intel x86) with Compex WLE350NX Wireless Radios. The network 104 can support one or more routing schemes, e.g., unicast, multicast and/or broadcast. In addition, certain firmware can be used to adjust certain parameters of the network 104 to enable low-latency transmission. Such parameters include enabling multicasting, disabling multicast IGMP snooping, and/or setting a beacon time, a DTIM interval, and/or a multicast rate. Furthermore, certain additional functionalities of the network 104 can be enabled for low-latency operation. Such functionalities include the ability to reprioritize multicast traffic, ignore nonessential traffic, and disable client PSM. These settings and functionalities may not be available within firmware or stock WiFi drivers.

Under a unicast routing scheme, every audio client (e.g., audio client 106) initiates a "session" and subsequently receives a separate audio stream directly from the audio server 102, which imposes a large load on the server 102 and the network 104 in terms of throughput. With this routing scheme, scalability is limited by the server's processing capabilities and available bandwidth. Under a multicast/broadcast routing scheme, the data is transmitted only once, and each audio client (e.g., audio client 106) receives the same stream. With this routing scheme, throughput is constant and independent of the number of clients. Each routing scheme can have potential strengths and weaknesses. For example, the ability to stream high quality, stereo audio to multiple clients can consume a lot of throughput with a unicast routing scheme. This effect can be mitigated using a multicasting or broadcasting routing scheme, which has the potential for very large scalability.

On the other hand, conventional multicasting and broadcasting routing schemes can throttle the transmission rate to the audio clients to accommodate potentially slower clients, and thus function at the expense of added latency, affecting even more capable clients as well. This effect can also cause instability to the live stream if the transmission rate is lower than the bit rate of the audio stream, causing no additional latency but frequent audible errors. In other embodiments, the "lowest" speed can be set to something that still transmits with an overall latency around 50 ms. For example, the multicast transmit speed can be set to anywhere between 6 and 56 Mb/s (e.g., 12 MB/s or 24 MB/s), which can be fast enough even when multicast is transmitted to clients in PSM. In some embodiments, the radio frequency used is in the 5 GHz spectrum and the signal-to-noise ratio should be very high. Channels occupied by other WiFi radio signals should be avoided for best results. Although the 2.4 GHz spectrum can also be used, radio interference from numerous sources may cause undesirable results in this range.

In some embodiments, the "Beacon Interval" set by the AP is set to a low value (e.g., between 13 milliseconds and 26 milliseconds or 10 milliseconds and 100 milliseconds). In some embodiments, the system communicates to all the clients that there is multicast data available for them using Delivery of Traffic Information Message ("DTIM"). In some embodiments the "DTIM Interval" is set to 1 or potentially lower. This setting ensures that with each beacon a DTIM message is sent to all clients. In some embodiments, "Airtime Fairness" is disabled. This action guarantees that the AP dedicate airtime to other clients on the network, causing additional jitter and network instability to the multicast. In some embodiments, 802.11n is exclusively used. In some embodiments, 802.11ac is exclusively used. In some embodiments, "AP isolation" is enabled, which minimizes additional network traffic by eliminating communication between clients, which in turn decreases jitter and improves network stability. In some embodiments, the Default Gateway address advertised to all clients via Dynamic Host Configuration Protocol ("DHCP") is 0.0.0.0. Since the address is not within the range of the local network, the clients are not able to route packets addressed to other networks (including the Internet) which prevents the clients from trying to access servers on the Internet, minimizing local traffic generated by the clients. On capable devices this will divert this traffic to additional network interfaces (e.g., LTE radio) allowing the device to maintain an internet connection. In some embodiments, the Wide Area Network ("WAN") connection is disabled. This minimizes load on the AP, which decreases jitter and improves network stability.

In some embodiments, sending quality of service ("QoS") header information (which is typically not included in the multicast packets) can help prevent the clients from going into PSM and alert the clients of high priority data, which can improve the clients' handling of the data. In some embodiments, a technique to disable PSM on the client's network interface is used. For example, a signal may be sent over the network to disable PSM on the clients, or the clients may disable it themselves using installed software. When connected to a network, client devices enter PSM when they no longer require the WiFi radio to send or receive data. During multicasting, this can be problematic due to the frequency of PSM being enabled. During a broadcast or multicast data transmission, PSM is typically started between the reception of individual data packets. This effect is dictated by elements such as the beacon interval and DTIM period. The effect can be useful when data can be buffered, but it can also be an obstacle when transmitting a constant, real-time, unbuffered data stream (e.g., devices entering into PSM can briefly cut off the signal if the interval is too long). Methods of mitigating this effect include decreasing the beacon interval to a very short duration (e.g., less than 20 ms). This solution creates some additional overhead (e.g., overall, rather than per device) to the AP and can make packet transmission less reliable. By disabling PSM, clients do not shut off their radios and the signal is not interrupted. In some embodiments, setting the "DTIM Interval" to 1 or lower as described above also helps to disable PSM on the clients.

In some embodiments, the AP can be configured to ignore a client going into PSM, which can mitigate the issue of the entire network operating in PSM, which in turn increases latency when even one client operates in PSM at the cost of all the clients operating in PSM and missing significant amounts of packets ("ACK"). Additionally, with the use of multicasting, packets are not retransmitted due to a lack of IEEE 802.11's Acknowledgement packets. There are benefits and drawbacks to this approach. One benefit is that no additional throughput is required for ACK packets that otherwise would increase in a linear fashion with the number of clients, which would in turn significantly affect the scalability of the network. In addition, the latency of the system would have to be increased in order to allow time for retransmitted data to arrive before the deadline. One drawback is that the missed data may be perceived as an audible noise or distortion. In some embodiments, transmitting multiple duplicates of every packet is used to mitigate packet loss, requiring the client to receive only one packet correctly from multiple duplicates being sent in order to receive a complete stream. This approach may mitigate packet loss, giving clients multiple chances to receive the lost or corrupted packet data.

To achieve high reliability and to maintain a degree of scalability, the invention can use a "multi-unicast" routing scheme, whereby each client is delivered a separate unicast stream (e.g., via each unique address in the network). Since multicast is not used, the speed of the network is not throttled, and PSM does not affect system performance. The limitation to this routing scheme is that for every client the AP transmits another data stream (set of packets) and network throughput increases in a linear fashion with the number of clients. Ultimately the number of clients is limited by the throughput of the network. Some testing shows that a typical high end access point can handle the streaming of an LPCM encoded, stereo, 16-bit, 48 KHz, audio stream to approximately 20 clients on one 5 GHz Wi-Fi radio channel. When using a Xirrus AP, a maximum of 20 clients per radio channel was achieved before performance degradation or increased latencies (>80 ms) resulted. Using multichannel access points, this capacity can be scaled up to the number of radio channels of which the access point is capable. For example, a four-channel access point could handle approximately 80 clients in a multi-unicast routing scheme.

Another limitation to this method is the sequential nature of the transmission to each individual client. Since a separate packet needs to be transmitted to each client, the delay between when the AP receives a packet and the time when the AP dispatches a packet to the last client increases in a linear fashion with the number of clients. This effect can be mitigated to a degree by increasing the transmission rate. Also, the AP can send duplicates of each packet to every client in arbitrary order and the order is not guaranteed to be the same for every packet with current implementation, which in turn can introduce additional jitter to the network. One consequence is that even if a large client count per AP could be achieved, maintaining low latency would be challenging. Additionally, unlike with a multicasting routing scheme, within a multi-unicast routing scheme, every packet needs to be acknowledged with ACK, which enables retransmission at a cost of increased network throughput that increases in a linear fashion with the number of clients. In turn, this results in increased latency and instability.

Each audio client 106 may be configured to receive the streaming audio signal via the network 104. Each audio client 106 includes a mobile device 122 with a wireless connection 124 and an installed audio application 126. The audio application 126 is configured to interpret the streaming audio signal, thereby producing an interpreted audio signal. The audio application 126 can include the following features: a real-time audio connection 128 configured to receive an audio stream from the network (e.g., a network socket); an L16PCM de-payloader 130 (or similar element), which takes the audio frames and decodes them, producing playable audio; a jitter buffer 132 for buffering audio frames extracted from RTP packets before they are required for playback; a clock sync 134 configured to compensate for the clock drift and to ensure that there is a sufficient number of audio frames buffered in the buffer to compensate for jitter introduced by various components of the system, thereby ensuring synchronization between the audio stream and local playback by the mobile application with reduced latency; a delay adjuster 136 for audibly aligning the audio signal provided by the mobile application to surrounding sound (e.g., sound generated by a PA system); an error concealment tool 138 configured to interpolate and/or supplement missing data in the audio stream; and an audio hardware buffer 140 configured for high frequency callback to deliver the streaming audio to the client's audio hardware interface. The audio client also has audio playback hardware 142 in communication with the mobile device. The audio playback hardware 142 is configured to play the interpreted audio signal for the end user.

Using the above setup, a total latency between the time the audio signal is provided to the system (e.g., when the audio signal representation of the music played on stage reaches the audio server) and the time the corresponding audio signal is outputted by the mobile device's audio hardware interface (e.g., right before the user hears live music in his or her headphones) is reduced. (Note that the latency of the stage equipment is neglected, as is any potential latency added by certain headsets, e.g., those using Bluetooth, which may add additional latency.) "Total latency" can be further distilled into individual latencies associated with the following system components, through which an audio signal must travel (and, hence, which may contribute to total latency): the audio server's audio hardware interface; the audio server's audio hardware interface driver; the audio server operating system; the audio server application; the audio server network stack including the network hardware interface driver; the audio server's network hardware interface; the Ethernet network; the network access point; the network; the mobile device's hardware wireless network interface; the mobile operating system's network stack including hardware wireless network interface driver; the mobile client application (including extra buffering for stable playback); the mobile operating system; the mobile device's audio hardware interface driver; the mobile device's audio hardware interface. In some embodiments, a fundamental trade-off exists between latency and reliability. If total latency is lowered, tolerance for delays and the time for handling errors falls as well. Thus, an appropriate balance must be struck between these two considerations to generate the optimal listening experience.

Generally, the total latency should be low enough that a listener does not perceive, or minimally perceives, an asynchronization between the visual experience of the event observed (e.g., the band's singing and playing instruments) and hearing the audio accompanying the show. Some tests and experiments have shown that users find a latency of up to 50 milliseconds to be acceptable, but it is also desirable to lower this latency to about 20 milliseconds or less, if possible. See, e.g., Carôt, Alexander and Werner, Christian, "Network Music Performance—Problems, Approaches and Perspectives" (available online at http://www.carotde/Docs/MITGV_AC_CW.pdf; page accessed on Apr. 20, 2017). However, under some circumstances, a total latency of higher than 50 milliseconds (e.g., about 100 milliseconds) may be acceptable. For example, additional latency may be less problematic for listeners sitting more than a certain distance from a sound source. As an example calculation, since sound travels at approximately 1125 feet per second, 89 ms of latency would naturally accompany a sound received 100 feet from the stage. In some cases in which the user's headphones are ineffective to conceal the ambient sound, additional latency may even be desired. In some embodiments, the invention uses location information of the concert attendee to determine the optimal audio mix to deliver to the concert attendee. For example, location information can be used to determine latency of the PA with respect to the concert attendee. In addition, location information can be used to determine and counteract audio distortions perceived by the concert attendee due to the physical shape of the concert venue.

The latency of the system can be bounded by the length of the buffer used to pass audio data between components of the system (e.g., between the audio streaming server's audio hardware interface and the audio server application; between the audio server application and the mobile client application (RTP packet's payload length); between the mobile client application and the mobile device's audio hardware interface). The longer the buffer length, the larger the latency associated with having to wait for enough data to fill the buffer. On the contrary, the shorter the buffer length, the higher the frequency of passing a buffer through the system, which increases load on the system and in turn increases power consumption (which may not be desirable for battery-powered mobile devices). Moreover, the total latency of the system is bounded by the longest buffer used in the whole pipeline (the weakest-link problem); therefore, it is desirable to match buffer size across the whole system to avoid unnecessary load without improving the total latency.

In some embodiments, the audio server application receives audio data in equal chunks, e.g., X frames of audio data (representing Y milliseconds of audio) every Y milliseconds. Correspondingly, the audio server creates a packet (e.g., a RTP packet) containing X frames of audio data and dispatches it over the network. In theory, each client application should receive one packet of data every Y milliseconds and should feed the data immediately into the device's audio hardware interface. However, in the real world, jitter is generated by different components of the system 100 (e.g., the network 104). Jitter can be defined as deviation from true periodicity of a presumed periodic signal. As described above, the audio client application 126 includes a jitter buffer 132 to compensate for this phenomenon. More specifically, the audio client application 126 can append X frames of received data into the jitter buffer, and then feed the data into the device's audio hardware interface as requested, X frames at a time. In some embodiments, the value of X is 256, but can optionally take on other values such as 128, 64, 32 or 16. In the real world, the size of the jitter buffer depends on the system's actual jitter and can be adjusted dynamically.

In some embodiments, during operation, the system's performance may change over time, e.g., because of changes in performance of the network caused by changes of user proximity to a transmitter and/or electromagnetic interference of different sources. In some embodiments, the system dynamically adapts to unpredictable performance changes on a per-client basis. If system performance decreases for a specific client, the latency for this client can be increased to prevent loss of playback stability. Correspondingly, when system performance increases for a specific client, the latency for this client can be decreased to optimize the listening experience.

In some embodiments, the system uses Real-time Transport Protocol (RTP) over User Datagram Protocol (UDP). However, one of ordinary skill in the art will recognize that a number of similar protocols could be used instead. In some embodiments, the Libre library (distributed under 3-clause Revised BSD License) is used to parse RTP packets and extract RTP headers and audio data. In some embodiments, missing data can be supplemented using a zero insertion error concealment technique. In some embodiments, reporting mechanisms and procedures can be implemented to help understand and diagnose failure modes of the system. In some embodiments, in which the server's hardware's clock has a different frequency than each client's hardware's clock, small differences in clock speed accumulate over time and become out of synchronization. In such embodiments, each audio client analyzes the incoming audio stream and adjusts its own playback speed to match the sample rate of the audio stream.

In some embodiments, in which there is a PA system or competing surrounding audio, the ambient audio also has an associated latency related to a listener's distance from the stage and/or another speaker system. To avoid an "echo" effect, it can be desirable that output from the system matches the surrounding sound. There are a number of different techniques that can be used to synchronize the playback, including different ways of locating a user in a venue and determining any required latency based on location. For example, sound can be analyzed sound from a microphone located in the user's headphones, and a required offset can be determined accordingly.

In some embodiments, the invention includes the ability to report on the quality of service. Each client can be monitored (e.g., continuously, continually, constantly, and/or periodically) for certain parameters of playback quality, including latency, jitter buffer length, missing packets, reorder packets, buffer underruns, delays in providing audio data to the audio hardware interface, and/or resulting playback stalls. Detailed data describing the quality of certain aspects of the service can be reported to the audio server in the venue via the network (e.g., in a way that does not interfere with playback). In some embodiments, the audio server propagates accumulated data over the Internet to an external global server to allow central quality control.

The invention can include at least one of several additional features to enrich the experience of listeners. In some embodiments, support can be provided for streaming separate audio streams simultaneously and providing a user-interface allowing users to mix different streams according to their preferences. For example, a user may wish to blend the audio input from a microphone of the user listening device with the streamed audio, thereby recreating a more personal experience of attending the audio event. In some embodiments, the application can incorporate social networking features, e.g., recording a video of a live performance and synchronizing streamed, high-quality audio, rather than input from a mobile device's microphones, and sharing the recoding over applicable social networks. In some embodiments the application can provide other features allowing users to re-live the event, e.g., by browsing the whole content they aggregated during the event including pictures, videos, and other interactions over social networks. In some embodiments, features are included to allow users to communicate and engage with their friends and people around the venue using text and/or voice in a "push-to-talk" manner, or to find each other in a crowd.

In some embodiments, the invention includes features relating to ticketing and providing information about the venue. In particular, the invention can engage listeners before the event by partnering with companies selling tickets and allowing users to purchase their tickets directly in the mobile application. In some embodiments, the invention provides information about the venue during the event, such as a map of the venue with marked points of interest, a schedule of the event and other metadata related to currently played music, and other important venue-specific information.

In some embodiments, the invention allows a user to mix in input from a microphone of the user listening device and adjust the volume. Such a mixing effect can be desirable in order to make the user more engaged with the surrounding environment, or to mitigate the impact of technical issues causing the playback to break. In some embodiments, the invention can enable streaming outside of the venue and listening to past-recorded performances, thereby moving beyond engaging only listeners attending the live event. In some embodiments, a service is provided that allows user to listen to a live performance from anywhere in the world over the Internet or to listen to recorded past live performances.

In some embodiments, the invention includes headphones that function as "in-ear monitors," which lock most sound out from the venue's PA system. In some embodiments, the user listening device provides the majority of the sound received by the listener, while the PA system provides only low frequency tones, which are not attenuated by the "in-ear monitor." The "in-ear" monitor's ear tip can be custom molded on-site. In some embodiments, the "custom mix" can be recorded on the concert attendee's mobile device and synchronized with a video of the concert performance. Such embodiments advantageously provide high quality audio that may otherwise be unavailable. The system can be monitored and maintained in order to ensure that it is continually meeting performance requirements.

In some embodiments in which a compression codec is used (such as AAC, HE-AAC MP3, MPE VBR, Apple Lossless, IMA4 (IMA ADPCM) or Opus), the audio streaming server application can also encode the audio data before creating the payload to be transmitted. Special care can be taken to set the Frames per Buffer ("FpB") setting precisely to the lowest possible value without causing hardware errors on either the server 102 or the client 106. Although the system 100 may operate at lower FpB (as low as 16 FpB using certain audio hardware interfaces), 128 FpB (2.7 milliseconds of LPCM encoded, stereo, 16-bit, 48 KHz audio data) can be the optimal setting (e.g., used in Jack-audio). This can allow both the server's audio hardware interface 108, as well as the client's audio hardware interface 142, to convert the audio signal from analog to digital and from digital back to analog, with the lowest number of errors, while maintaining the lowest latency. This FpB setting is what determines the length of the packets' payload.

In some embodiments, due to the physics of sound, the stream audio may appear to be "early" compared to the acoustic sound traveling through the air. Although technically the stream audio is more accurately timed to the source (e.g., is more closely matched to the visual element of the performance), it may conflict with the noise generated by the source. This effect may be negatively enhanced if a PA or other amplification system is also being used at the time. To compensate for this echo effect, a buffered delay can be either manually or automatically set in the application to help match this timing when both audio signals are received by the listener.

In some embodiments, it is beneficial to measure latency or other quantities associated with latency. Measurements can be taken using the following equipment: a computer capable of audio processing; a multi-channel sound card interface (two inputs and two outputs minimum); and impulse response measurement software (e.g., SMAART 8). For optimal measurements, a stereo configuration can be used (using four inputs and four outputs) but mono measurements can also provide accurate results. In some embodiments, the process of measurement follows six basic steps. First, using a patch cable, connect at least one output to one input of the audio hardware interface. This creates a "loopback" from the output to the input of the audio interface. (This should be done with a patch cable and not in software, because additional, unpredictable, latencies can be introduced by software patching and it does not factor the latencies introduced by the hardware's analog-to-digital converter and digital-to-analog converter). Second, generate a reference signal (e.g., Pink Noise, Pink Sweep, Sine wave tone) and route it through multiple outputs of the audio interface. This signal can be routed to the output in the above instruction used as a "loopback." Additionally this signal can be routed to at least one other output that will feed the input of the audio server. Third, using a patch cable, connect the additional output(s) to the input of the audio server. This will send the reference tone through the system. Fourth, using a patch cable, connect the audio output of the client to an audio input of the measurement audio interface. There should now be at least two cables connected to the measurement audio interface. Fifth, using the impulse response measurement software, configure the "reference" input to be the "loopback" channel(s) referenced above. Also set the "measurement" input to be the channel(s) fed by the client device's audio output. Sixth, using the impulse response measurement software, measure the difference in audio latency between the "reference" channel and the "measurement" channel. This creates a latency measurement between the "loopback" (which measures the speed of the audio through the patch cable, which is essentially realtime) against the streamed audio path (the time it takes to travel through the system further referenced in this document). Measuring data transmission speeds does not necessarily equate to perceived latencies by the end user as it does not include encoding, decoding and any additional processing time needed to deliver the analog signal to the end user.

In some embodiments, due to the efficiency of the true "multicast" replication, the theoretical maximum number of clients connecting to the AP is infinite. This implies that for a given AP the number of clients that it can service is only limited by the range and not the number of clients associating with the AP. This results in a drastic reduction of the number of APs that are needed to service a given event, especially one where the density of clients is large (as is the case with a typical stadium or auditorium style event). This results in reduced cost and management overhead.

In addition, in such embodiments, the entire network architecture can be further optimized. Typically from the source to the destination APs, there are a number of network devices (routers and switches) that may be needed to replicate the streams to the APs. This network is typically organized as a "tree," in which each stage is capable of replicating the stream to a fixed number of downstream devices. Because each AP can service potentially an unlimited number of clients, the number of such devices and the depth of the "tree" can be drastically reduced. In some embodiments, the streaming computer can be attached to just one AP that would service the entire event. This would lead to reduced latency (as each switch level in the tree adds to the latency) as well as reduced cost from a network architecture standpoint. In some embodiments, a radio wave is created instead of redundant information. Such embodiments can provide infinite scalability and lower overhead.

In some embodiments, using location information provided by client computing device to optimize the audio mix delivered to the client computing device includes at least one of (i) adding static correction based off of the distance between the AP and server; (ii) correcting for distance between device and server: not correcting to each individual client; Bluetooth beacon; device's microphone to locate distance; wireless triangulation). In some embodiments, today, the earphones simply isolate out the PA system.

Figure 2B:
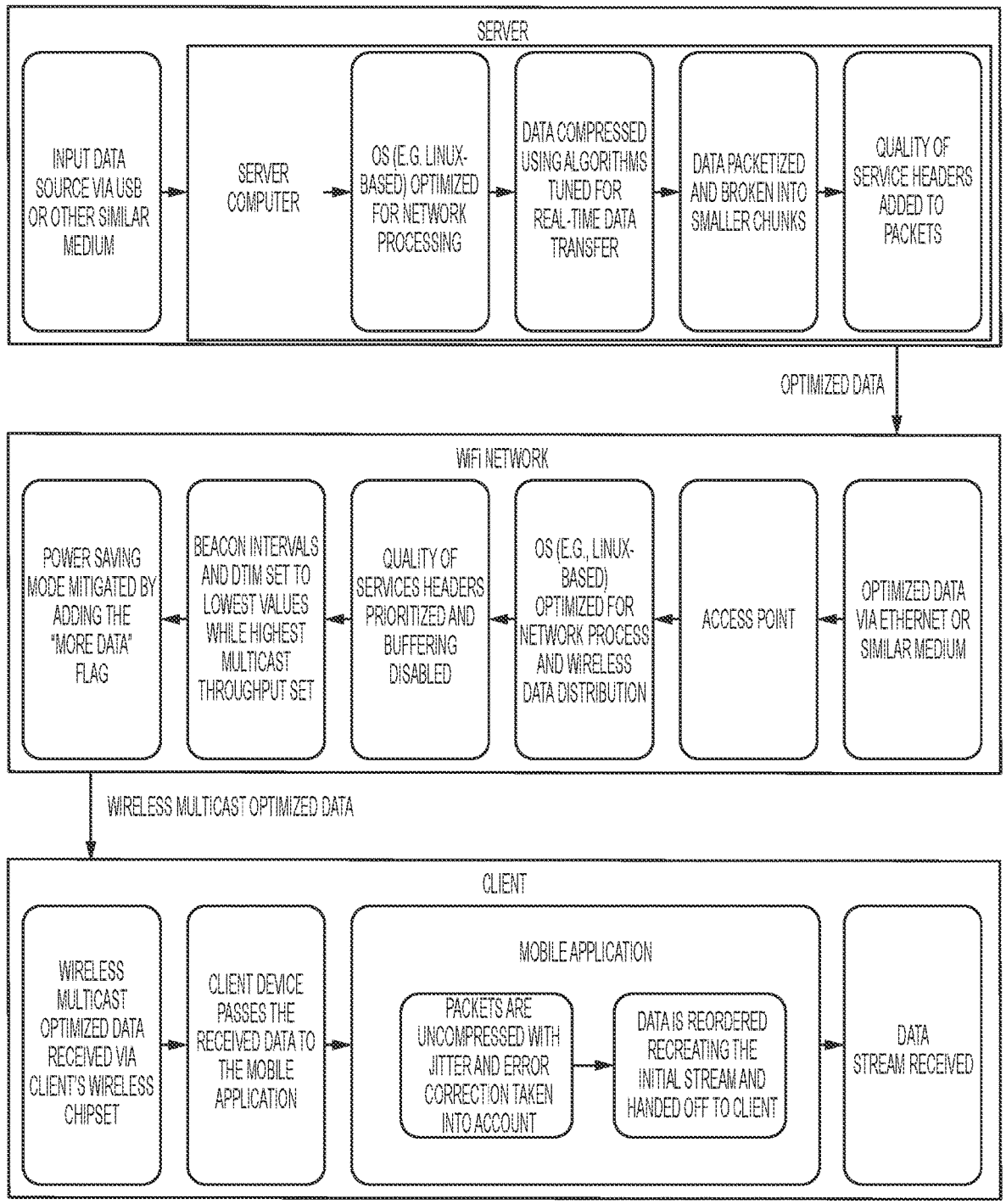
FIG. 2B is a schematic diagram of an additional system architecture for a real-time data delivery system, according to an illustrative embodiment of the invention.
Figure 2C:
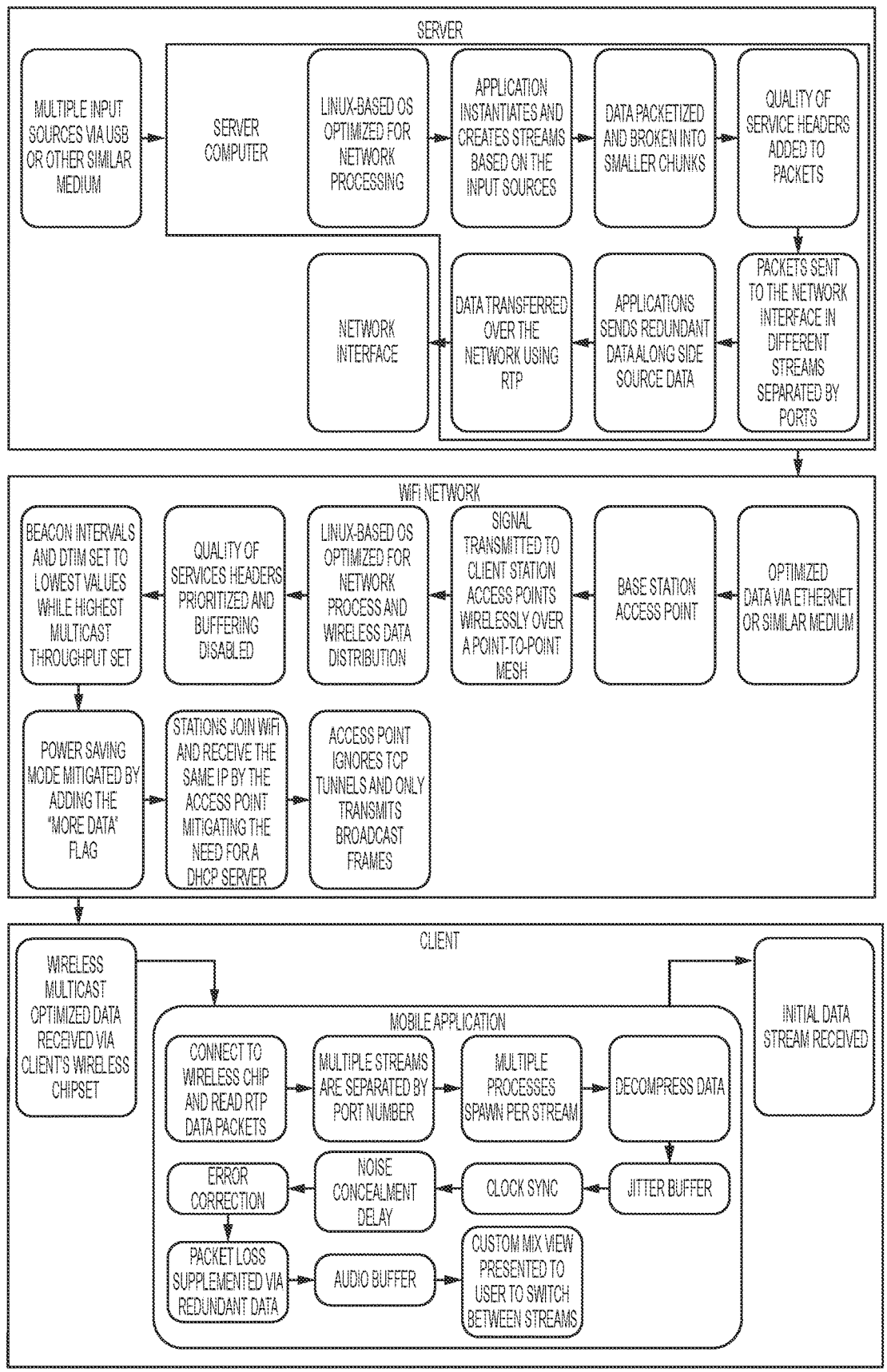
FIG. 2C is a schematic diagram of an additional system architecture for a real-time data delivery system, according to an illustrative embodiment of the invention.

FIG. 2A is simply an exemplary setup, and FIGS. 2B and 2C are shown to provide additional possibilities for the basic configuration among the server, the WiFi network, and the client. FIGS. 2B and 2C are schematic diagrams of additional system architectures for a real-time data delivery system, according to illustrative embodiments of the invention. FIGS. 2B and 2C show similar system elements with notable differences that are readily apparent to one having skill in the art. FIG. 2B shows a similar setup to FIG. 2A, with the constituent elements applying to data more generally, as opposed to just audio. FIG. 2C shows another similar setup, with notable changes that (i) the server includes a multi-data stream scenario, and (ii) the WiFi network access point can broadcast to another access point, which in turn can broadcast to clients, thus creating a mesh network.

As described above, devices entering PSM can hinder the functioning of this invention. Thus, in the present invention, PSM can be disabled by modifications made directly within the AP or WiFi network. For example, the AP can be configured to send a message in the Beacon that tells all client devices to disable PSM remotely. This invention is particularly beneficial for devices running iOS, which does not allow disabling of PSM by the device. In particular, all iOS devices use a chipset that has a "fail-safe mode" in which PSM becomes disabled if the mobile device senses that the AP is "malfunctioning." For example, in the Beacon packet, the DTIM count, which corresponds to a current point within the DTIM interval, can be set (e.g., manually or automatically) to be higher than the DTIM interval itself. Such a scenario can appear to the client device that a miscalculation has been performed. The client device can interpret the perceived miscalculation as an indication of an issue with the AP. In an effort not to miss any potential data, the iOS (and potentially other) client devices remain active for a longer duration than normal, which effectively disables PSM.

Using the above approach, the real-time data stream predominantly flows in one direction (e.g., from the AP to the client devices). Generally, Wi-Fi networking has been based on unbiased communication among all devices on the system, and the need for simultaneous reception of data from a single source has been infrequent. Due to the destructive nature of multicasting and broadcasting consuming much or most of the available airtime, most systems were previously designed to avoid this situation. The present system creates what amounts to a workaround of the current architecture, and creates an essentially unidirectional real-time data stream from one AP to one or more (e.g., many) mobile devices.

In some embodiments, the Beacon packet can be manipulated via the driver of the radio in the AP (e.g., during a "wake up" period of a client device). In some embodiments, other optimizations besides PSM are made to advance the goal of enabling the AP for real-time data streaming to one or more client devices. For example, the system can also reprioritize multicast and broadcast addressed packets to be the highest priority traffic. This approach stands in contrast to the traditional functioning of an AP, in which unicast traffic is prioritized above all else. Traditionally, broadcast and multicast packets are considered the lowest priority and so are treated accordingly, and other nonessential traffic is ignored by the AP. So, if a client device attempts to communicate over the network, the AP ignores it and continues to transmit.

In some embodiments, isolation of each client from the internet and other client devices on the network helps to achieve low latency transmission of real-time data. Communication between devices consumes valuable airtime and can become particularly problematic as many devices join the wireless network. Client isolation can commonly be enabled by adjusting a setting in the AP. To mitigate the issue of clients communicating between separate APs on the same network, "bridge isolation mode" can be enabled. This can be accomplished by creating a network of VLANs assigned to a bridge on the server, with each AP assigned a VLAN number. The server can then isolate each VLAN by isolating each AP on the network from each other AP and only having the APs visible to the server.

In the configuration described above, the Wi-Fi network limits communication by the client devices. For example, traditional internet will not operate optimally (or in some cases, at all) while a real-time data stream is running. In some embodiments, the system diverts all other traffic (e.g., to the LTE network of the mobile device, if available). In some embodiments, the system permits a large (e.g., approaching a limitless) number of client devices on the network. While there can be a small increase in essential traffic with additional client devices connecting to the network and obtaining an IP address, reprioritizing the packets sent to the broadcast address limits those communications to the small gaps between streaming packets. In some embodiments, the above system does not require multiple networks. A single server is able to create a highly scalable network using the above-described APs. The signal is only limited by the reception range to any one of the APs. This range can be increased to kilometer scale using a single AP and a sector antenna.

In some embodiments, modifications can be made to one or more drivers that allow passing a single command to enable and disable PSM, as well as to control other features (e.g., multicast and/or broadcast reprioritization, and/or ignoring certain types of traffic. Specifically, a specialized file can be created on the AP that can be called upon by a certain command (e.g., something easy to remember such as "Echo 1" or "Echo 0") that tells the driver (e.g., wireless driver) whether to function in the established mode. In some embodiments, processing of "virtual carrier sense" can be disabled (e.g., by changing a hardware register setting) to make the AP ignore certain unneeded frames and/or non-essential traffic.

Figure 3:
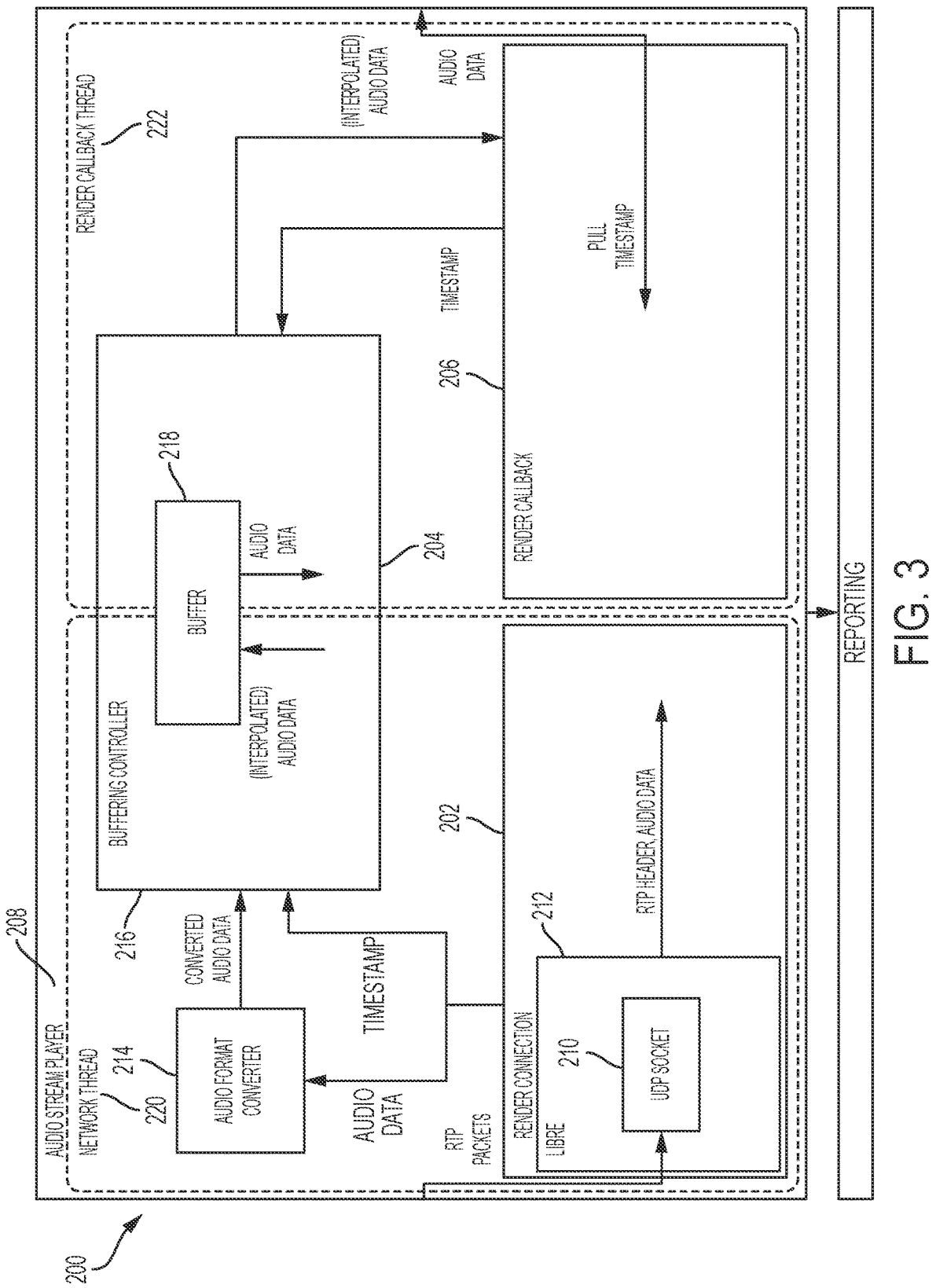
FIG. 3 is a detailed schematic diagram of a mobile streaming application (e.g., an audio stream player, as shown), according to an illustrative embodiment of the invention.

FIG. 3 is a detailed schematic diagram of a mobile streaming application (e.g., an audio stream player) 200, according to an illustrative embodiment of the invention. In some embodiments, the mobile streaming application 200 includes four main components: an RTP connection 202 responsible for listening to incoming RTP packets and processing them; a buffering controller 204 responsible for managing buffering; a render callback 206 responsible for feeding audio data to the operating system for playback; and an audio stream player 208 responsible for mediating between the three previous components and passing audio data along with metadata between them. The RTP connection 202 is responsible for creating a network socket 210 (e.g., a UDP Socket) and configuring it correctly for receiving RTP packets, and for parsing the received RTP packets using Libre library 212 in order to extract both a sequence number field and a timestamp field from the RTP header and the payload, which consists of audio data encoded in an agreed-upon format. The sequence number is used to determine if any packets were missed or delivered in an incorrect order. Also, the sequence number can be correlated with a timestamp to determine if the audio streaming server omitted any frames or sent any frames more than once. In addition, other fields from the RTP header can be used to validate the packet. Any issues discovered in the incoming RTP packets should be reported to a logging subsystem (not shown) which is used for both troubleshooting and monitoring the system's performance both during development and after deployment.

The audio data along with the timestamp is passed from the RTP Connection 202 component to an Audio Format Converter 214 of the audio stream player 208. The Audio Format Converter 214 is responsible for converting the incoming audio data into an agreed format used for processing audio data by the client (the exact format may differ depending on the mobile device's hardware and operating system, but the format can be a type of LPCM encoding). The converted audio data along with the timestamp is then passed to the buffering controller 216. The buffering controller 216 is responsible for using the timestamp to check if the incoming audio data is either overlapping with the previously received audio data (which could occur if the audio streaming server doesn't operate correctly) or there is discontinuity between previously received audio data and the incoming audio data (as the result, for example, of missed packets or the audio streaming server skipping frames). Any overlapping data should be discarded, and any discontinuity should be interpolated by means of an error concealment algorithm. The resulting data should be stored in the buffer (e.g., the audio buffer).

The process described above is triggered every time the application receives an RTP packet and may be executed independently and asynchronously to the rest of the application's code (a separate thread of execution). The implementation of handling an incoming RTP packet should be as efficient as possible in order to minimize the interval between the time the application receives an RTP packet from the operating system and the time when the corresponding processed audio data is placed into the buffer. The interval constitutes a part of the total latency of the system. Likewise, the implementation should run in a predictable amount of time, as any variations of the interval contribute to the system's jitter. The biggest value of the interval can bound the minimum total latency of the system. Any operations that take an indeterminate amount of time should not be invoked (e.g., yielding current quantum of allocated CPU time as a result of an operation that requires a system call—this includes but is not limited to: memory allocation, acquiring a lock, performing I/O operation, interacting with Objective-C runtime, etc.). In order to meet system performance requirements, the buffer can be a lock-free circular buffer that is thread-safe with a single producer and a single consumer.

Symmetrically to the network thread of execution feeding audio data into the buffer (e.g., the network thread 220), there can be a separate thread of execution that runs independently and asynchronously to the rest of the application's code (e.g., the render callback thread 222), which is responsible for feeding the audio data from the buffer to the audio hardware interface via the operating system's render callback 206. When the render callback 206 runs with real-time thread priority, there can be an imposed deadline (in the sense of a real-time programming deadline), and missing the deadline can be considered a critical system failure. The number of frames requested by the render callback 206 at the time is configurable, and a higher value can increase the latency associated with having to wait for enough of a number of frames to become available, whereas a lower value can increase the frequency of the render callback 206, which decreases the available interval to return the data and increases load on the mobile device, and hence increases power consumption. For example, with the render callback 206 requesting 128 frames at a time and a sample rate of 48 kHZ, the render callback 206 is called approximately every 128/48 kHZ~2.667 ms, which means that the render callback 206 should return 2.667 ms of audio data within 2.667 ms or less. If the render callback 206 does not return the requested audio data on time, the audio hardware interface can run out of data to drive the output, and it can drive the output with a signal with amplitude of zero, which can be perceived by a user as audible silence. Moreover, it is likely to cause an audible glitch as a result of a step change in the output signal's amplitude and associated high frequency response. This kind of failure can manifest itself as the render callback 206 skipping frames, and they can be reported to the logging subsystem. Therefore, the performance requirements that are advisable for the network thread 220 of execution in order to decrease the system's total latency are relevant to the render callback thread 222 of execution.

The render callback 206 is responsible for filling a hardware buffer provided by the operating system with audio data from the buffer 218 and returning it back to the caller. Before filling the hardware buffer, excess audio data from the buffer 218 needs to be discarded if necessary (for example, if the render callback 206 has skipped frames). If there is not enough audio data in the buffer 218 to fill the whole hardware buffer (buffer underrun), the remaining audio data needs to be interpolated by means of the error concealment algorithm, and later the equivalent amount of expired incoming audio data (that arrived too late or never arrived, and therefore, was interpolated by the RTP Connection) should be discarded from the buffer in order to stay synchronized with the stream (otherwise the latency will increase). Buffer underruns can be reported to the logging subsystem.

The buffer 218 in the mobile streaming application can be empty before starting the playback. When the user requests to start the playback, the buffer 218 needs to be primed before the playback can start in order to accumulate some amount of audio data in the buffer 218 (and in turn may introduce some artificial latency) to be able to compensate for jitter. The mobile streaming application may not be aware how the system is performing, and hence may not know the required length of the buffer (the critical buffer length) to ensure disruption-free playback without adding unnecessary latency, without probing the system's performance before starting the playback (which would introduce a significant delay between the time the user requested the playback to start and the time the playback starts). Therefore, the value used for initial buffer length is just an estimate that could be based on a default value, a default value specific for the venue, or past system performance.

The buffer length can be expressed by the number of frames. However, since every incoming RTP packet should contain an equal number of frames, it can be desirable to express the initial buffer length by number of packets instead. If the initial buffer length is not a multiple of the number of frames contained in an RTP packet, some number of frames may need to be discarded when finalizing priming of the buffer. Once the initial buffer length is determined, the audio stream player initializes the buffering controller 216 (the buffer 218 is marked as not primed during initialization), and initializes the RTP Connection 202 and the Render Callback 206. The Buffering Controller 216 can return audio data representing silence (all the frames with value of zero) before the buffer length reaches the initial buffer length. Once the initial buffer length is reached, the Buffering Controller 216 can discard excess data in the Buffer 218 (if any) and mark the Buffer 218 as primed. Then, audio data can start to be returned from the Buffer 218 to the Render Callback 206. The Buffer 218 can stay primed until playback stops. When playback stops, the remaining audio data from the Buffer 218 can be discarded and the buffer can be marked as not primed.

In some embodiments, the system accounts for clock drift and implements measures to compensate for it. Since every hardware electronic clock has a slightly different frequency, the audio receiving client's latency is going to drift over time since frequency of reads and writes to the Buffer 218 may not be equal. If the mobile device's clock has a higher frequency than the audio streaming server's clock, the latency and the buffer length may increase slightly over time, and the Buffer 218 might eventually overflow. Otherwise, if the mobile device's clock has a lower frequency than the audio streaming server's clock, the latency and the buffer length can decrease over time, and the playback can start breaking when the buffer length decreases below a certain buffer length.

Dynamic Sample Rate Adjustment ("DSRA") aims to keep the buffer length constant at a desired buffer length (hence the latency). A buffer offset can be defined as the buffer length minus the desired buffer length (buffer length−desired buffer length). The buffer offset should be as close to zero as possible at all times. A positive value of the buffer offset indicates that there are more frames in the buffer than the desired buffer length. In this case, the playback rate should be increased on the mobile device. A negative buffer offset indicates that there are fewer frames in the buffer than the desired buffer length. In this case, the playback rate should be decreased on the mobile device. The DSRA is a feedback control system designed to maintain the buffer offset as close to zero as possible at all times by manipulating playback rate on the mobile device.

Measuring buffer length can be a dynamic process that should account for any unpredictability introduced by any jitter. A momentary buffer length can be defined as a number of frames received minus a number of frames played (frames received−frames played). Both the number of frames received and the number of frames played can be calculated based on corresponding timestamps (the last timestamp+number of frames received or requested the last time−the first timestamp). Also, possible timestamp overflows need to be taken into account. However, the value of momentary buffer length can be unstable, since every time audio data is written to or read from the buffer the value changes.

It is helpful to consider how the buffer length would behave in a system without any clock drift. When the playback starts, the buffer length equals the initial buffer length, and immediately the Render Callback 206 starts consuming the audio data from the Buffer 218, and hence the momentary buffer length decreases. At some point later, new audio data is going to arrive and the momentary buffer length is going to reach the initial buffer length eventually. The momentary buffer length is going to oscillate between some value and the value of the initial buffer length. Therefore, a "Sliding Window Algorithm" can be used to find the maximum value of the momentary buffer length that occurred in the immediate past. The width of the window should be as short as possible to ensure responsiveness when measuring, but it should be at least twice the period of the longest oscillation to provide reliable measurement. It is sufficient to measure the momentary buffer length only either when writing or when reading to or from the buffer by probing both the value before and after the operation in order to be able to find a maximum or minimum value of the momentary buffer length. This kind of measurement of buffer lengths is subject to quantization noise, which should be eliminated.

The DSRA requires a transfer function to determine the extent of playback rate adjustment based on the buffer offset. The system's performance for every audio receiving client is going to vary over time as a result of changes in the environment including changing electromagnetic interferences, among other factors. As a result, having a constant buffer length is impractical as the constant buffer length is going to be either too high or too low most of the time, resulting in added redundant latency or suboptimal playback quality, respectively. Dynamic Buffering Adjustment ("DBA") aims to determine a critical buffer length, and calculate the desired buffer length for the DSRA based on it. The DBA is an extension to DSRA and it is built on top of it. The DBA requires measuring the minimum value of momentary buffer length by the Sliding Window Algorithm in addition to the maximum value. Based on both the minimum and the maximum value of the momentary buffer length, a value of momentary jitter can be calculated by subtracting the minimum value from the maximum value of momentary buffer length (maximum momentary buffer length−minimum momentary buffer length).

Another Sliding Window Algorithm can be used to compute the biggest jitter (the worst case scenario) that occurred in the immediate past. Choosing an appropriate value for the width of the window is a matter of compromise between probability of a buffer underrun and providing the lowest latency possible. If the length of the windows is relatively short, the audio receiving client will try to lower the latency relatively quickly after the jitter decreased, which might cause a buffer underrun if the jitter increases again. On the contrary, with a relatively long width of the window the audio receiving client will wait longer with decreasing the latency in order to lower the probability of the jitter decrease being just a temporary artifact. More formally, a critical buffer length could be defined as the lowest buffer length that prevents the minimum momentary buffer length from dropping below zero (a buffer underrun). It is advisable to omit the minimum values of the momentary buffer length that are a result of missed packets, as missed packets cannot be considered as jitter. The desired buffer length can be defined as the critical buffer length plus a safety margin buffer length. As a result of its design, the DBA is able to increase or decrease latency without losing continuity of the playback in a way that is imperceptible to the user.

In the case that the jitter increases gradually over time, the DBA is able to detect it before a buffer underrun occurs (if the speed of change is slow enough) thanks to having the safety margin buffer length. The DBA can try to introduce extra latency to compensate for higher jitter by decreasing the playback rate. Usually, playback rate adjustment is greatly limited to avoid audible changes in pitch, but in some cases it can be beneficial to dramatically decrease the playback rate in order to prevent a buffer underrun and resulting playback discontinuity at the expense of audible pitch change.

In the case that the playback continuity breaks due to a buffer underrun, missed packets, or the Render Callback 206 skipping frames, there is a chance of performing Step Latency Change ("SLC") without substantially affecting the quality of playback. The SLC operates by injecting extra frames with silence to the stream in order to increase latency, or by discarding some frames from the Buffer 218 in order to decrease latency when playback stalls. SLC can be most useful to implement Latency Backoff ("LB") when latency suddenly increases. With LB, a user will experience one longer break in playback instead of experiencing multiple breaks (stuttering) until the latency gets adjusted.

Figure 4A:
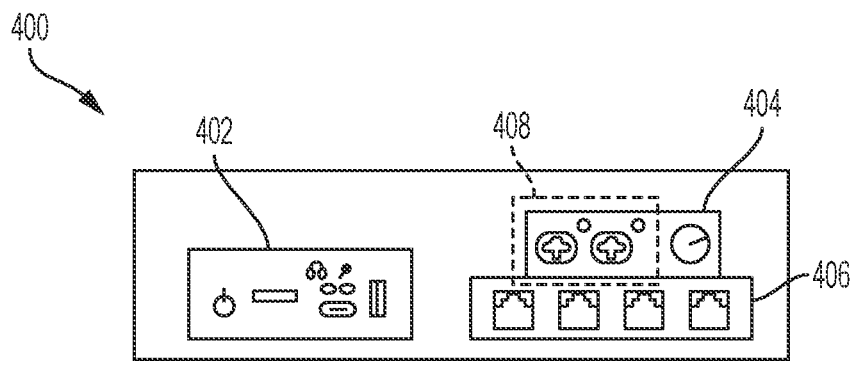
FIG. 4A is a schematic diagram of a server rack for real-time data delivery (e.g., audio), according to an illustrative embodiment of the invention.
Figure 4B:
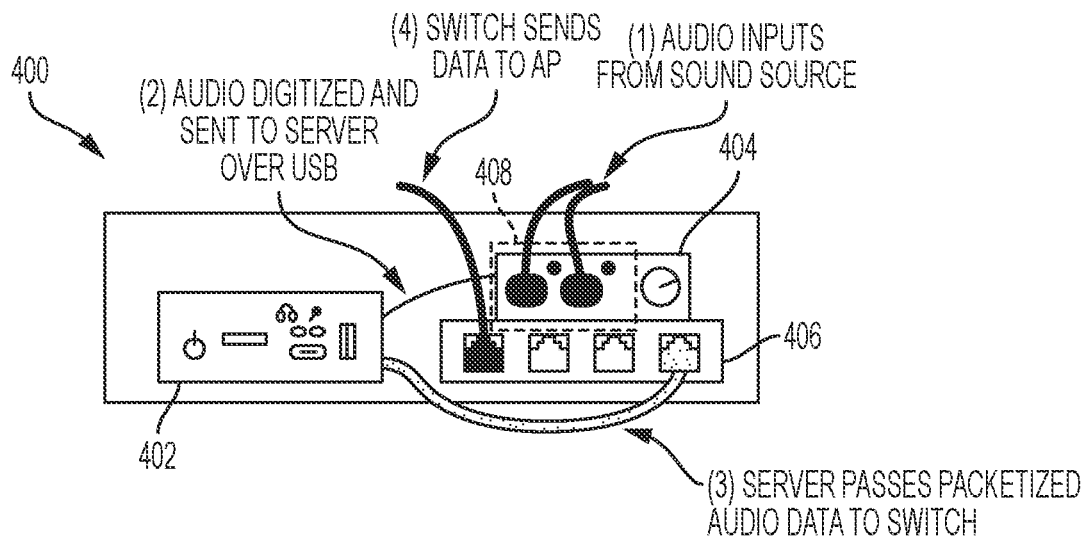
FIG. 4B is a schematic diagram of the server rack of FIG. 4A connected and ready to deliver real-time data (e.g., audio), according to an illustrative embodiment of the invention.

FIG. 4A is an illustration of a server rack 400 for real-time data (e.g., audio) delivery, according to an illustrative embodiment of the invention (e.g., illustrating a live embodiment of the single data stream schematic shown above in FIG. 2B). The server rack 400 includes a server 402, an audio interface 404, a network switch 406, and an XLR input (e.g., a L/R audio source) 408. FIG. 4B is a schematic diagram of the server rack of FIG. 4A connected and ready to deliver real-time data (e.g., audio), according to an illustrative embodiment of the invention. FIG. 4B illustrates certain electrical connections made between the elements of FIG. 4A and certain other elements to implement the invention in the context of a live audio event. First, audio inputs from the sound source flow into the ports depicted. Second, audio is digitized and sent to the server over USB, as depicted. Third, the server passes packetized data (e.g., audio data) to the network switch, as depicted. Fourth, the network switch sends the data to the network access point.

Figure 5:
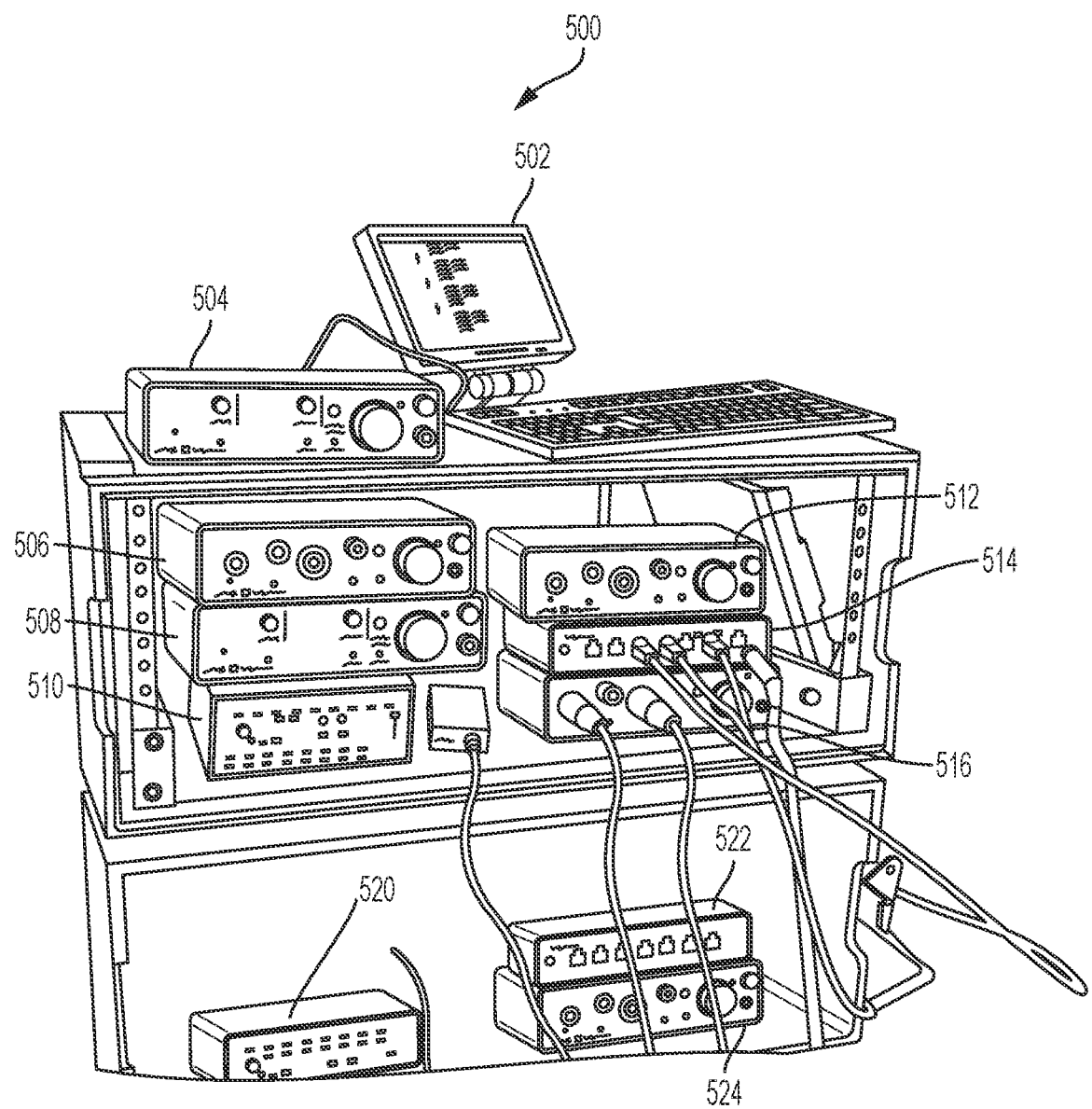
FIG. 5 is an illustration of a live setup showing a live real-time audio server, according to an illustrative embodiment of the invention.

FIG. 5 is a rendering of a live setup 500 showing a live real-time audio server, according to an illustrative embodiment of the invention (e.g., illustrating a live embodiment of the single data stream schematic shown above in FIG. 2B). FIG. 5 includes a server computer 502, multiple audio interfaces 504, 506, 508, 512, 516, 524, the server 510, network switches 514, 522, and a redundant server rack 520.

Figure 6:
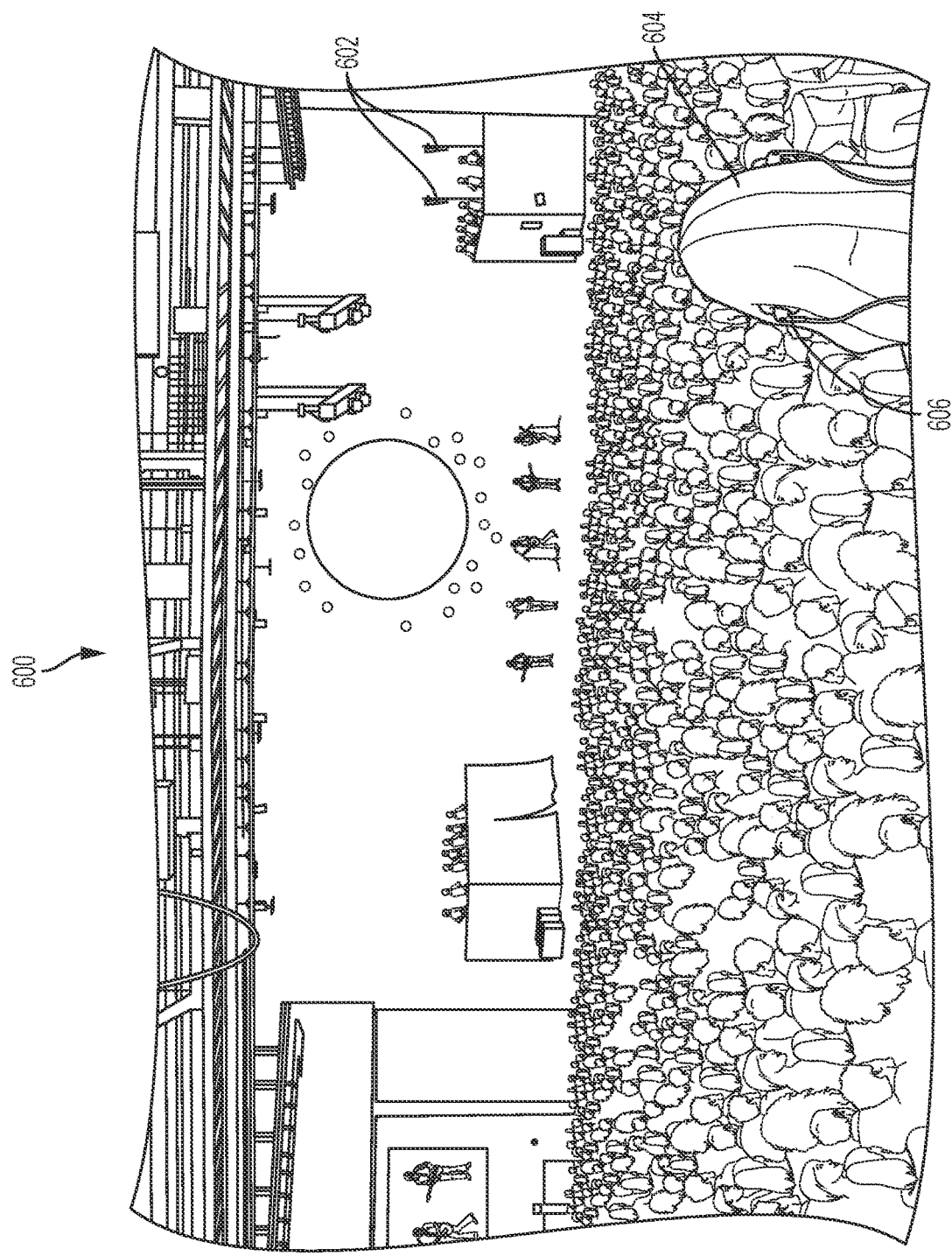
FIG. 6 is a rendering of a live setup showing a live audience and multiple wireless network access points, according to an illustrative embodiment of the invention.

FIG. 6 is a rendering of a live setup 600 showing a live audience and multiple wireless network access points 602, according to an illustrative embodiment of the invention. As shown, thousands of audience members, each carrying a client computing device, are viewing the show and listening via their client computing devices. For example, the individual 604 in the foreground is listening to the concert via her headphones 606.

The above-described technologies can have many applications across a range of industries, including applications involving transmission of audiovisual data, sensor data, application data, and other data. They are particularly suitable for systems that require, or would benefit from, a small amount of data to be transmitted to a high number of clients with low latency and/or low jitter (e.g., up to 100 ms less than a standard WLAN). The invention can also be particularly suitable for applications in which data transmission is frequent and periodic. Decreasing latency and/or jitter by 100 ms can have a high impact on systems that require synchronization. For example, for humans latency can be perceived when watching audiovisual content as lack of synchronization between audio and vision. This makes it particularly suitable for distributed systems that need to communicate (especially for synchronization purposes) over WLAN, for example, Wireless Sensor Networks and Internet of Things. Several non-limiting examples are explained in detail below.

A) Gaming. The invention can enable transmission of data simultaneously to a number of clients for gaming purposes. For example, client devices can be connected to a central network server in a BINGO hall, and the server can update client devices in real time as numbers and letters are called out. In other instances, LAN gaming requires client applications to communicate small amounts of data with minimal latency to ensure every player has an even experience. Traditionally, latency numbers are 60 ms or higher, but as competitive gaming becomes more popular, the necessity for delays under 30 ms has become apparent.

In some embodiments, the invention can be used to reduce in-game latency dramatically. In such scenarios, client devices (e.g., phones, laptops or gaming consoles) can connect to a network in communication with a server running the present invention alongside any gaming server processes that are needed. The server can make use of the data reported back from the clients as well as broadcast information to the client devices. Because the invention increases the scaling capability of the system, increasing the number of players (which is generally limited to 64) to upward of 100 would be possible.

B) Public/Emergency Broadcast System. Network APs can be used in high density areas to serve as platforms for content and as emergency broadcast services. For example, in a mall, the invention can be used to run sale-specific ads (visual, video, text-based, or audio) with the ability to broadcast emergency information (visual, video, text-based, or audio).

This use case makes use of the potentially infinite scalability of the invention. Traditionally, high density APs recommend that no more than 50 clients connect and pass traffic at once, but a single AP in accordance with the present invention can handle 1,000 or more clients. In emergency scenarios, there can be less hardware to deploy, and so the situation can allow for low effort, cookie cutter, local networks. The invention can be used to (1) request and receive data regarding the situation for users which can be aggregated in real time; (2) allow users to communicate with each other without needing to rely on the internet in the event that cellular towers are down; and/or (3) broadcast messages to groups in real-time. In this scenario, clients can behave as they normally would, but instead of getting a constant stream of music from the server, they can receive broadcast messages. Similarly, instead of reporting data back generically to the server, messages can be sent directly to individuals.

C) Group AR/VR Experiences. The network can service collective AR and VR experiences (e.g., server-enabled glasses that large audiences can be wearing to receive the same data at the same time). In VR experiences, synchronizing hardware motion to visual cues can be immensely important. Currently, most VR headsets need to be hardwired to prevent users from feeling nauseated. The present invention can be used to provide a wire-free, low-latency VR experience.

In this scenario, the VR devices can have small wireless receivers, and the base station can act as the server transmitting information between devices and whatever processing unit is displaying images, video, and/or sound in VR. In AR, the viewing devices (such as glasses) can have the server running on them and AR-enabled object can behave as clients. This would call for a user to interact with an object and perform actions (such as to move the object around or interact with it in AR) without causing a break in the user's immersion. In both scenarios, all devices can be connected to the network.

D) Private Blockchain Update. A mining client can update all the non-mining clients in a private wifi blockchain. Private blockchains need data to be transferred between clients in order to function. Data can be sent wirelessly over the network to keep private blockchains in sync. These blockchains, or distributed ledgers, require special access or permission to participate, rather than being open to the public. Some private blockchains are hyperledger, multichain, tendermint, R3/corda, and chain. A private blockchain is a blockchain that an enterprise uses for its own internal purposes, such as a company like Google or Amazon, where the same data needs to be transferred to multiple clients in real time.

As blockchain invention begins to create new applications, it may not be reasonable to expect every device to be in constant communication with the Internet. However, this can be necessary or beneficial in order for the blockchain ledger to be up to date. Using the present invention, a central and/or singular device can be Internet-enabled and can pass on ledger information in real time. For example, using a department store sales tablet, private blockchain invention can enable inventory and sales of individual items to be tracked across warehouses and stores. However, deploying an internet-enabled wireless network for all of these devices (which can be 50 or more per store) would be costly and largely unneeded. With low-latency communication, only a fraction of time would be added to the update overhead. (For example, if it took 200 ms for an internet enabled device to get an update, a non-internet enabled device might take 220 ms.) In this scenario, an internet-enabled server would push blockchain ledger updates to the client devices over a dedicated network.

E) Sign Language Translation. The network can simultaneously transmit video data to clients for real-time American Sign Language translation at live events. In addition to real-time audio transmission, the present invention can transmit video to a client as well. In this scenario, a video recording device would be send data over USB to the server. The server would then pass that data along over the network to client devices, which can render the feed for sign language users.

F) SMPTE Time code/click track sync. Time code is form of media metadata that can be broadcasted over a single audio track for synchronization and identification. The invention can transmit this data track to unlimited mobile devices through a mobile application for synchronized content as well as wireless distribution of timecode.

G) MIDI Trigger. The invention can be used for wireless multicast of MIDI data to electronic or digital MIDI-enabled devices, to remotely trigger sounds and control parameters of an electronic music performance. Using USB/Lightning to MIDI cables can allow the use of mobile devices as receivers through the application.

H) CV/Eurorack for analog syths. CV (control voltage gate) is an analog method for controlling synthesizers, drum machines and other similar equipment with external sequencers. The invention can be used to broadcast a signal to mobile devices using a mobile application to distribute analog signals wirelessly to remote equipment.

I) DMX lighting. DMX is used to control stage lighting and effects. The invention can be used to transmit a signal wirelessly to unlimited mobile devices with a mobile application installed (e.g., using a USB to DMX converter).

J) Show/ride control systems. A show/ride control system refers to a controller for devices used at a performance. This can be, for example, fans or rumble seats at movie theatres, light up sticks or wristbands at live performances. These devices need to synchronize with particular events during a live show. Using the present invention, they can achieve this in real time, expanding the control system from traditionally timer-based deployments to real-time deployments.

K) Data acquisition telemetry. Within the network, client devices can "check in" at specified intervals and report any sort of relevant data. The network can create a reporting policy and distribute it to client devices, allowing for real-time, lightweight acquisition of data from a large number of client devices.

L) Lightfield video stream. Lightfield video streams require video from one source and lightfield data from another source be synced and merged in real time to render a lightfield video frame. The present invention can make use of an ultrasonic frequency as a metronome as well as have the lightfield data streamed to the server and merged with the video source. Generally, this merging of data needs to be done after the videos are taken as there is not presently a way to receive the light field or the video data with low enough latency. The network can help address this issue.

M) 360 video pick stitch stream. Similar to video transmission for sign language, multiple video streams can be transmitted and stitched together in real time either by the client device or pre-stitched by a server.

N) IMAG simulcast. Similar to the blockchain update model, simulcast is a system where audio and visual data is streamed via internet to one source and then redistributed to multiple non-internet enabled sources. For example, if a bar has multiple projectors, instead of running cabling across the bar from every projector to a central PC, the PC can simulcast the data over a dedicated network to clients connected to each projector.

O) Multi camera broadcast. This use case is similar to 360 video, however the video would not need to stitched together to provide a 360 view.

P) VR synch to 3D visuals and content. Synchronizing to separate systems in real time is necessary or highly desirable in VR/AR applications, e.g., to prevent visual-to-motion disconnects. Similar to what was described for light field systems, an ultrasonic tone can be synchronized to disparate systems over the network at a centralized source or server.

Q) Internet data transmission over a mesh hop to non-internet enabled devices. With more devices becoming internet-enabled, placing them all on a network and providing them internet access can become taxing to the WAN. An example of this would be IoT devices. Similar to the blockchain model, a central server (e.g., a SmartThings hub) can communicate reporting policies as well as broadcast messages to IoT devices, allowing them to post information to the internet, without needing to provide the infrastructure to access the internet. This would allow devices to communicate over a mesh hop without needing to worry too much about density due to the network scaling feature, as well as cabling, as devices no longer need to be internet enabled.

R) Self Driving car communication framework. Self-driving cars will need to provide some form of communication across a fleet to adjust a wide number of driving parameters. By embedding simple WiFi chips within the vehicles, cars can connect to the network and listen to broadcasts as well as send updates in real time. For example, traffic is simply an amalgamation of human latency. The delay in response stacks across operators and results in stop-and-go traffic. Using the network, self-driving cars can communicate changes instantly and even in high density, cars 100 cars away can react and adjust their driving metrics within seconds. Syncing to separate systems in real time is necessary in VR/AR to prevent visual-to-motion disconnects. Similar to what was described for light field systems, an ultrasonic tone can be sync disparate systems over the network at a centralized server. While the invention has been particularly shown and described with reference to specific preferred embodiments, it should be understood by those skilled in the art that various changes in form and detail may be made therein without departing from the spirit and scope of the invention as defined by the following claims. For clarity, it should also be understood that delivering audio in "real-time" includes and accounts for certain latencies described above (e.g., up to about 100 milliseconds) and for this purpose is synonymous with "near-real-time."

What is claimed is:

1. A method of minimizing total latency of streaming a live data stream produced by a streaming data system while preserving continuity of the live data stream, the method comprising streaming a received live data stream over a wireless network between a server and a user listening device coupled to a smartphone and individually minimizing a latency of each of the following streaming data system components that are in a path of streaming of the received live data stream between the server and the user listening device:
the server's hardware interface;
the server's hardware interface driver;
a server application;
the server's network stack including a network hardware interface driver;
the server's network hardware interface;
an Ethernet network;
the wireless network's access port;
the wireless network;
the smartphone's hardware wireless network interface;
the smartphone's operating system network stack including a hardware wireless network interface driver;
a smartphone client application;
the smartphone's operating system; and
the smartphone's hardware interface coupled to the user listening device,
wherein a sum of latencies of each of the above streaming data system components from a first time of receiving the live data stream by the server's hardware interface to a second time of outputting the live data stream to the user listening device by the smartphone's hardware interface is less than 100 milliseconds.

2. The method of claim 1, wherein the sum of latencies is less than 50 milliseconds.

3. The method of claim 1, wherein the sum of latencies is less than 20 milliseconds.

4. The method of claim 1 wherein the server hardware interface comprises a sound card.

5. The method of claim 1 wherein the server application comprises an audio processing software.

6. The method of claim 5 wherein the audio processing software is configured to adjust at least one of bit depth, sample rate, buffer settings, or routing settings.

7. The method of claim 5 wherein the audio processing software is configured to packetize and transmit audio data over Real-time Transport Protocol.

8. The method of claim 7 wherein the audio processing software is configured to packetize and transmit L16PCM audio data over Real-time Transport Protocol.

9. The method of claim 1 wherein the Ethernet network is capable of at least 10 Mb/s communication.

10. The method of claim 9 wherein the Ethernet network is capable of at least 100 Mb/s communication.

11. The method of claim 10 wherein the Ethernet network is capable of at least 1000 Mb/s communication.

12. The method of claim 1 wherein the wireless network is capable of supporting at least one of unicast, multicast, or broadcast.

13. The method of claim 1 wherein minimizing the latency of the wireless network comprises enabling multicasting.

14. The method of claim 1 wherein minimizing the latency of the wireless network comprises disabling multicast IGMP snooping.

15. The method of claim 1 wherein minimizing the latency of the wireless network comprises setting a beacon time.

16. The method of claim 1 wherein minimizing the latency of the wireless network comprises setting a DTIM interval.

17. The method of claim 1 wherein minimizing the latency of the wireless network comprises setting a multicast rate.

18. The method of claim 1 wherein minimizing the latency of the wireless network comprises reprioritizing multicast traffic.

19. The method of claim 1 wherein minimizing the latency of the wireless network comprises ignoring nonessential traffic.

20. The method of claim 1 wherein minimizing the latency of the wireless network comprises disabling client PSM.

* * * * *